US010086282B2

(12) United States Patent
Mao et al.

(10) Patent No.: US 10,086,282 B2
(45) Date of Patent: *Oct. 2, 2018

(54) TRACKING DEVICE FOR USE IN OBTAINING INFORMATION FOR CONTROLLING GAME PROGRAM EXECUTION

(75) Inventors: Xiaodong Mao, Foster City, CA (US); Richard L. Marks, Foster City, CA (US); Gary M. Zalewski, Oakland, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/382,252

(22) Filed: May 8, 2006

(65) Prior Publication Data
US 2006/0274032 A1 Dec. 7, 2006

Related U.S. Application Data

(63) Continuation-in-part of application No. 10/207,677, filed on Jul. 27, 2002, now Pat. No. 7,102,615, and a
(Continued)

(51) Int. Cl.
*A63F 13/428* (2014.01)
*A63F 13/212* (2014.01)
(Continued)

(52) U.S. Cl.
CPC ............ *A63F 13/428* (2014.09); *A63F 13/06* (2013.01); *A63F 13/211* (2014.09);
(Continued)

(58) Field of Classification Search
CPC ........... A63F 13/00; A63F 13/10; A63F 13/06
(Continued)

(56) References Cited

U.S. PATENT DOCUMENTS 4,458,536 A * 7/1984 Ahn ........................ G01V 1/184
367/178
4,811,243 A 3/1989 Racine
(Continued)

FOREIGN PATENT DOCUMENTS

EP 0 652 686 5/1995 ............... H04R 3/00
EP 0867798 9/1998 ............. G06F 3/033
(Continued)

OTHER PUBLICATIONS

Design and implementation of a 3D computer game controller using inertial MEMS sensors [online] [dated 2004]. [retrieved Sep. 13, 2016]. Retrieved from the Internet: <http://digitalcommons.mtu.edu/cgi/viewcontent.cgi?article=1577&context=etds>.*
(Continued)

*Primary Examiner* — Robert T Clarke, Jr.
(74) *Attorney, Agent, or Firm* — JDA Patent; Joshua Isenberg; Robert Pullman

(57) ABSTRACT

A tracking device for use in obtaining information for controlling an execution of a game program by a processor for enabling an interactive game to be played by a user and related apparatus are disclosed.

31 Claims, 5 Drawing Sheets

Related U.S. Application Data continuation-in-part of application No. 10/650,409, filed on Aug. 27, 2003, now Pat. No. 7,613,310, and a continuation-in-part of application No. 10/663,236, filed on Sep. 15, 2003, now Pat. No. 7,883,415, and a continuation-in-part of application No. 10/759,782, filed on Jan. 16, 2004, now Pat. No. 7,623,115, and a continuation-in-part of application No. 10/820,469, filed on Apr. 7, 2004, now Pat. No. 7,970,147, and a continuation-in-part of application No. 11/301,673, filed on Dec. 12, 2005, now Pat. No. 7,646,372, and a continuation-in-part of application No. 11/381,729, filed on May 4, 2006, now Pat. No. 7,809,145, and a continuation-in-part of application No. 11/381,728, filed on May 4, 2006, now Pat. No. 7,545,926, and a continuation-in-part of application No. 11/381,725, filed on May 4, 2006, now Pat. No. 7,783,061, and a continuation-in-part of application No. 11/381,727, filed on May 4, 2006, now Pat. No. 7,697,700, and a continuation-in-part of application No. 11/381,724, filed on May 4, 2006, now Pat. No. 8,073,157, and a continuation-in-part of application No. 11/381,721, filed on May 4, 2006, and a continuation-in-part of application No. 11/382,031, filed on May 6, 2006, now Pat. No. 7,918,733, and a continuation-in-part of application No. 11/382,032, filed on May 6, 2006, now Pat. No. 7,850,526, and a continuation-in-part of application No. 11/382,033, filed on May 6, 2006, now Pat. No. 8,686,939, and a continuation-in-part of application No. 11/382,035, filed on May 6, 2006, now Pat. No. 8,797,260, and a continuation-in-part of application No. 11/382,036, filed on May 6, 2006, and a continuation-in-part of application No. 11/382,041, filed on May 7, 2006, now Pat. No. 7,352,359, and a continuation-in-part of application No. 11/382,038, filed on May 6, 2006, now Pat. No. 7,352,358, and a continuation-in-part of application No. 11/382,040, filed on May 7, 2006, now Pat. No. 7,391,409, and a continuation-in-part of application No. 11/382,034, filed on May 6, 2006, now abandoned, and a continuation-in-part of application No. 11/382,037, filed on May 6, 2006, now Pat. No. 8,313,380, and a continuation-in-part of application No. 11/382,043, filed on May 7, 2006, now abandoned, and a continuation-in-part of application No. 11/382,039, filed on May 7, 2006.

(60) Provisional application No. 60/718,145, filed on Sep. 15, 2005.

(51) Int. Cl.
*A63F 13/211* (2014.01)
*A63F 13/213* (2014.01)
*G01P 15/00* (2006.01)
*A63F 13/20* (2014.01)
*G01P 15/08* (2006.01)

(52) U.S. Cl.
CPC ............ *A63F 13/212* (2014.09); *G01P 15/00* (2013.01); *A63F 13/213* (2014.09); *A63F 2300/105* (2013.01); *A63F 2300/1081* (2013.01); *A63F 2300/1087* (2013.01); *A63F 2300/6045* (2013.01); *G01P 2015/0805* (2013.01)

(58) Field of Classification Search
USPC .................... 345/158; 463/36–39; 73/510
See application file for complete search history.

(56) References Cited

U.S. PATENT DOCUMENTS

| | | | | |
|---|---|---|---|---|
| 4,872,342 | A * | 10/1989 | Hanson | G01P 15/0888 29/595 |
| 4,963,858 | A | 10/1990 | Chien | 345/157 |
| 5,128,671 | A | 7/1992 | Thomas, Jr. | 341/20 |
| 5,181,181 | A | 1/1993 | Glynn | |
| 5,195,179 | A | 3/1993 | Tokunaga | 345/159 |
| 5,226,321 | A | 7/1993 | Varnham et al. | |
| 5,262,777 | A | 11/1993 | Low et al. | 341/20 |
| 5,296,871 | A | 3/1994 | Paley | 345/163 |
| 5,335,011 | A | 8/1994 | Addeo et al. | 348/15 |
| 5,435,554 | A | 7/1995 | Lipson | |
| 5,440,326 | A | 8/1995 | Quinn | |
| 5,453,758 | A * | 9/1995 | Sato | 345/158 |
| 5,485,273 | A * | 1/1996 | Mark et al. | 356/467 |
| 5,554,980 | A | 9/1996 | Hashimoto et al. | 340/825.72 |
| 5,602,566 | A | 2/1997 | Motosyuku et al. | |
| 5,670,774 | A | 9/1997 | Hill | |
| 5,831,164 | A * | 11/1998 | Reddi et al. | 73/514.01 |
| 5,878,367 | A | 3/1999 | Lee et al. | |
| 5,930,741 | A * | 7/1999 | Kramer | 702/153 |
| 6,022,274 | A | 2/2000 | Takeda et al. | 463/44 |
| 6,067,858 | A | 5/2000 | Clark et al. | |
| 6,157,403 | A | 12/2000 | Nagata | |
| 6,173,059 | B1 | 1/2001 | Huang et al. | 381/92 |
| 6,176,837 | B1 | 1/2001 | Foxlin | |
| 6,184,847 | B1 | 2/2001 | Fateh et al. | |
| 6,400,374 | B2 | 6/2002 | Lanier | 345/630 |
| 6,417,836 | B1 | 7/2002 | Kumar et al. | 345/156 |
| 6,545,661 | B1 * | 4/2003 | Goschy et al. | 345/158 |
| 6,681,629 | B2 | 1/2004 | Foxlin et al. | |
| 6,752,719 | B2 | 6/2004 | Himoto | |
| 6,757,068 | B2 | 6/2004 | Foxlin | |
| 6,890,262 | B2 | 5/2005 | Oishi et al. | 463/31 |
| 6,990,639 | B2 | 1/2006 | Wilson | 715/863 |
| 7,102,615 | B2 | 9/2006 | Marks | 345/156 |
| 7,113,166 | B1 | 9/2006 | Rosenberg et al. | |
| 7,158,118 | B2 | 1/2007 | Liberty | 345/158 |
| 7,180,502 | B2 | 2/2007 | Marvit et al. | |
| 7,239,301 | B2 | 7/2007 | Liberty et al. | 345/158 |
| 7,262,760 | B2 | 8/2007 | Liberty | 345/158 |
| 7,345,670 | B2 | 3/2008 | Armstrong | |
| 7,373,242 | B2 | 5/2008 | Yamane | |
| 7,414,611 | B2 | 8/2008 | Liberty | 345/158 |
| 7,489,298 | B2 | 2/2009 | Liberty et al. | |
| 7,489,299 | B2 | 2/2009 | Liberty et al. | 345/163 |
| 7,565,295 | B1 * | 7/2009 | Hernandez-Rebollar | 704/271 |
| 8,072,424 | B2 | 12/2011 | Liberty | |
| 8,137,195 | B2 | 3/2012 | Penzias | |
| 8,797,260 | B2 | 8/2014 | Mao et al. | |
| 2002/0015137 | A1 | 2/2002 | Hasegawa | |
| 2002/0021277 | A1 | 2/2002 | Kramer et al. | |
| 2002/0024500 | A1 | 2/2002 | Howard | 345/158 |
| 2002/0036617 | A1 | 3/2002 | Pryor | |
| 2002/0065121 | A1 | 5/2002 | Fukunaga et al. | |
| 2002/0160836 | A1 * | 10/2002 | Watanabe | A63F 13/12 463/42 |
| 2002/0196445 | A1 | 12/2002 | McClary et al. | |
| 2003/0047464 | A1 | 3/2003 | Sun et al. | 379/392.01 |
| 2003/0063064 | A1 | 4/2003 | Braun et al. | |
| 2003/0063065 | A1 | 4/2003 | Lee et al. | 345/156 |
| 2003/0149803 | A1 * | 8/2003 | Wilson | 710/1 |
| 2003/0160862 | A1 | 8/2003 | Charlier et al. | 348/14.08 |
| 2003/0193572 | A1 | 10/2003 | Wilson et al. | 348/207.99 |
| 2004/0032796 | A1 | 2/2004 | Chu et al. | |
| 2004/0060355 | A1 * | 4/2004 | Nemirovsky | G01P 15/093 73/504.14 |
| 2004/0070564 | A1 | 4/2004 | Dawson et al. | 345/156 |
| 2004/0118207 | A1 * | 6/2004 | Niendorf | G01P 15/0888 73/514.16 |
| 2004/0140962 | A1 * | 7/2004 | Wang et al. | 345/179 |

(56) References Cited

U.S. PATENT DOCUMENTS

| | | | |
|---|---|---|---|
| 2004/0147318 A1* | 7/2004 | Shahoian et al. | 463/36 |
| 2004/0207597 A1 | 10/2004 | Marks | 345/156 |
| 2004/0212589 A1 | 10/2004 | Hall et al. | |
| 2004/0213419 A1 | 10/2004 | Varma et al. | 381/92 |
| 2005/0037844 A1 | 2/2005 | Shum et al. | |
| 2005/0047611 A1 | 3/2005 | Mao | 381/94.7 |
| 2005/0059488 A1 | 3/2005 | Larsen et al. | 463/36 |
| 2005/0162384 A1 | 7/2005 | Yokoyama | 345/156 |
| 2005/0174324 A1 | 8/2005 | Liberty et al. | 345/156 |
| 2005/0212766 A1 | 9/2005 | Reinhardt et al. | |
| 2005/0226431 A1 | 10/2005 | Mao | 381/61 |
| 2005/0233808 A1 | 10/2005 | Himoto et al. | |
| 2005/0256391 A1 | 11/2005 | Satoh et al. | |
| 2005/0257614 A1* | 11/2005 | Schirmer et al. | 73/504.12 |
| 2006/0204012 A1 | 9/2006 | Marks | 382/26 |
| 2006/0233389 A1 | 10/2006 | Mao et al. | 381/92 |
| 2006/0239471 A1 | 10/2006 | Mao et al. | 381/92 |
| 2006/0252474 A1 | 11/2006 | Zalewski et al. | 463/1 |
| 2006/0252475 A1 | 11/2006 | Zalewski et al. | 463/1 |
| 2006/0252477 A1 | 11/2006 | Zalewski et al. | 463/7 |
| 2006/0252541 A1 | 11/2006 | Zalewski et al. | 463/36 |
| 2006/0252543 A1 | 11/2006 | Van Noland et al. | |
| 2006/0256081 A1 | 11/2006 | Zalewski et al. | 345/156 |
| 2006/0264258 A1 | 11/2006 | Zalewski et al. | 463/36 |
| 2006/0264259 A1 | 11/2006 | Zalewski et al. | 463/36 |
| 2006/0264260 A1 | 11/2006 | Zalewski et al. | 463/36 |
| 2006/0269072 A1 | 11/2006 | Mao | 381/56 |
| 2006/0269073 A1 | 11/2006 | Mao | 381/56 |
| 2006/0274032 A1 | 12/2006 | Mao et al. | 345/156 |
| 2006/0274911 A1 | 12/2006 | Mao et al. | 380/334 |
| 2006/0277571 A1 | 12/2006 | Marks | 725/37 |
| 2006/0280312 A1 | 12/2006 | Mao | 381/56 |
| 2006/0282873 A1 | 12/2006 | Zalewski et al. | 725/133 |
| 2006/0287084 A1 | 12/2006 | Mao et al. | 463/37 |
| 2006/0287085 A1 | 12/2006 | Mao et al. | 463/37 |
| 2006/0287086 A1 | 12/2006 | Zalewski et al. | 463/37 |
| 2006/0287087 A1 | 12/2006 | Zalewski et al. | 463/37 |
| 2007/0015558 A1 | 1/2007 | Zalewski et al. | 463/1 |
| 2007/0015559 A1 | 1/2007 | Zalewski et al. | 463/1 |
| 2007/0021208 A1 | 1/2007 | Mao et al. | 436/36 |
| 2007/0025562 A1 | 2/2007 | Zalewski et al. | 381/92 |
| 2007/0061413 A1 | 3/2007 | Larsen | 704/247 |
| 2007/0066394 A1 | 3/2007 | Ikeda et al. | 463/37 |
| 2007/0081695 A1 | 4/2007 | Foxlin et al. | |
| 2007/0113653 A1* | 5/2007 | Nasiri | G01P 1/023 73/510 |
| 2007/0213127 A1* | 9/2007 | Sato | A63F 13/06 463/36 |
| 2007/0216894 A1 | 9/2007 | Garcia et al. | |
| 2007/0258599 A1 | 11/2007 | Mao | 381/71.1 |
| 2007/0260340 A1 | 11/2007 | Mao | 700/94 |
| 2007/0260517 A1 | 11/2007 | Zalewski et al. | 705/14 |
| 2007/0261077 A1 | 11/2007 | Zalewski et al. | 725/35 |
| 2008/0014987 A1 | 1/2008 | Kusada et al. | |
| 2009/0143877 A1* | 6/2009 | Panje | G06F 1/1626 700/83 |

FOREIGN PATENT DOCUMENTS

| | | | |
|---|---|---|---|
| EP | 1033882 | 9/2000 | H04N 7/18 |
| EP | 1074934 | 2/2001 | G06K 11/08 |
| EP | 1 335 338 | 8/2003 | G08C 17/00 |
| EP | 1332778 | 8/2003 | |
| EP | 1 411 461 | 4/2004 | G06K 11/18 |
| EP | 1 489 596 | 12/2004 | G10L 11/02 |
| JP | 06042971 | 2/1994 | |
| JP | H0682242 A | 3/1994 | |
| JP | 06-198075 | 7/1994 | |
| JP | 06198075 | 7/1994 | |
| JP | 11253656 | 9/1999 | |
| JP | 2000148380 A | 5/2000 | |
| JP | 2000259340 A | 9/2000 | |
| JP | 2000308756 A | 11/2000 | |
| JP | 2002090384 A | 3/2002 | |
| JP | 2002153673 A | 5/2002 | |
| JP | 2002515976 A | 5/2002 | |
| JP | 2004302993 A | 10/2004 | |
| JP | 2005021458 A | 1/2005 | |
| JP | 2006-031515 | 2/2006 | |
| JP | 2006031515 A | 2/2006 | |
| JP | 200675218 | 3/2006 | |
| JP | 2006110382 A | 4/2006 | |
| WO | 9732641 A | 9/1997 | |
| WO | WO97/32641 | 9/1997 | |
| WO | WO 2004/073814 | 9/2004 | A63F 13/00 |
| WO | WO 2004/073815 | 9/2004 | A63F 13/02 |
| WO | WO 2006/121896 | 11/2006 | G10L 21/02 |

OTHER PUBLICATIONS

U.S. Appl. No. 11/301,673, Entitled, "Methods and Systems for Enabling Direction Detection When Interfacing With a Computer Progam" to Richard Marks, filed Dec. 12, 2005.

U.S. Appl. No. 11/381,728, entitled, "Echo and Noise Cancellation," to Xiadong Mao, filed May 4, 2006.

U.S. Appl. No. 29/259,350, entitled, "Controller With Traking Sensors," to Gary Zalewski, filed May 6, 2006.

U.S. Appl. No. 29/259,348, entitled, "Tracked Controller Device," to Gary Zalewski, filed May 6, 2006.

U.S. Appl. No. 60/798,031 entitled, "Dynamic Target Interface," to Bruce Woodard, filed May 6, 2006.

U.S. Appl. No. 29/259,349 entitled, "Controller With Infared Port," to Teiyu Goto, filed May 6, 2006.

U.S. Appl. No. 29/246,744, entitled "Video Game Contoller Front Face," to Teiyu Goto, filed May 8, 2006.

U.S. Appl. No. 29/246,743, entitled "Video Game Controller," to Teiyu Goto, filed May 8, 2006.

Definition of "mount"—Merriam-Webster Online Dictionary; downloaded from the Internet <http://www.m-w.com/dictionary/mountable, downloaded on Nov. 8, 2007.

U.S. Appl. No. 29/246,767, entitled "Video Game Controller," filed May 8, 2006.

U.S. Appl. No. 29/246,768, entitled "Video Game Controller," filed May 8, 2006.

U.S. Appl. No. 29/246,763, entitled "Ergonomic Game Controller Device With LEDs and Optical Ports" filed May 8, 2006.

U.S. Appl. No. 29/246,759, entitled "Game Controller Device With LEDs and Optical Ports" filed May 8, 2006.

U.S. Appl. No. 29/246,765, entitled "Design for Optical Game Controller Interface" filed May 8, 2006.

U.S. Appl. No. 29/246,766, entitled "Dual Grip Game Control Device With LEDs and Optical Ports" filed May 8, 2006.

U.S. Appl. No. 29/246,764, entitled "Game Interface Device With LEDs and Optical Ports" filed May 8, 2006.

U.S. Appl. No. 29/246,762, entitled "Ergonomic Game Interface Device With LEDs and Optical Ports" filed May 8, 2006.

Office Action dated Jul. 25, 2008 for U.S. Appl. No. 11/382,035.

International Search Report and Written Opinion of the International Searching Authority—International application No. PCT/US07/67005 dated Jun. 18, 2008.

Final Office Action dated Jan. 7, 2009 for U.S. Appl. No. 11/382,035, 15 pages.

Rodger Richey—"Measure Tilt Using PIC16F84A & ADXL202", AN715, Microchip Technology Inc., 1999.

Office Action dated Mar. 30, 2010 issued for U.S. Appl. No. 11/382,035.

Final Office Action dated Dec. 28, 2009 issued for U.S. Appl. No. 11/382,035.

Office Action dated May 27, 2009 issued for U.S. Appl. No. 11/382,035.

Advisory Action dated Mar. 17, 2009 issued for U.S. Appl. No. 11/382,035.

Advisory Action dated Jul. 20, 2009 issued for U.S. Appl. No. 11/382,033.

Final Office Action dated Apr. 28, 2009 issued for U.S. Appl. No. 11/382,033.

Office Action dated Sep. 5, 2008 issued for U.S. Appl. No. 11/382,033.

(56) References Cited

OTHER PUBLICATIONS

Final Office Action dated Sep. 14, 2010 issued for U.S. Appl. No. 11/382,035.
Final Office Action dated Aug. 20, 2010 issued for Chinese Application No. 200780016103.5.
Examiner's Answer to Appeal Brief dated Sep. 21, 2010 issued for U.S. Appl. No. 11/382,033.
Supplementary European Search Report for European application No. 07760947 dated Nov. 24, 2010.
Japanese Office action for JP application No. 2012-080340 dated Sep. 10, 2013.
Japanese Office Action for JP application No. 2012-257118 dated Dec. 17, 2013.
Non-Final Office Action for U.S. Appl. No. 11/381,721, dated Feb. 11, 2014.
Notice of Allowance for U.S. Appl. No. 11/382,035, dated Mar. 26, 2014.
Japanese Final Office Action for JP Application No. 2009-509932 dated Aug. 20, 2013.
Japanese Office Action dated Feb. 28, 2012 for Japanese Patent Application No. 2009-509932.
Final Office Action for U.S. Appl. No: 11/382,035, dated Dec. 6, 2013.
Notice of Allowance for U.S. Appl. No. 11/382,033, dated Nov. 16, 2013.
Encyclopedia Britannica, edition of 2002, p. 53"accelerometer".
European Office Action dated Jun. 4, 2013, issued for European Patent Application No. 07760947.7.
Co-Pending U.S. Appl. No. 14/448,622, to Xiaodong Mao, filed Jul. 31, 2014.
Final Office Action for U.S. Appl. No. 11/381,721, dated Jul. 15, 2014.
Japanese Office Action for JP Application No. 2013-021698, dated Aug. 13, 2014.
Final Office Action for U.S. Appl. No. 12/891,633, dated Jan. 28, 2015.
Notice of Allowance for U.S. Appl. No. 11/381,721, dated Dec. 15, 2014.
Non-Final Office Action for U.S. Appl. No. 14/448,622, dated Mar. 17, 2016.
Non-Final Office Action for U.S. Appl. No. 12/891,633, dated Mar. 10, 2016.
Final Office Action for U.S. Appl. No. 14/448,622, dated Sep. 8, 2016.
Notice of Allowance for U.S. Appl. No. 14/448,622, dated Feb. 17, 2017.

* cited by examiner

TRACKING DEVICE FOR USE IN OBTAINING INFORMATION FOR CONTROLLING GAME PROGRAM EXECUTION

CLAIM OF PRIORITY

This application also claims benefit of U.S. Provisional Patent Application No. 60/718,145, entitled "AUDIO, VIDEO, SIMULATION, AND USER INTERFACE PARADIGMS", filed Sep. 15, 2005, which is hereby incorporated by reference.

This application is a continuation in part (CIP) of U.S. patent application Ser. No. 10/207,677, entitled, "MAN-MACHINE INTERFACE USING A DEFORMABLE DEVICE", filed on Jul. 27, 2002; U.S. patent application Ser. No. 10/650,409, entitled, "AUDIO INPUT SYSTEM", filed on Aug. 27, 2003; U.S. patent application Ser. No. 10/663,236, entitled "METHOD AND APPARATUS FOR ADJUSTING A VIEW OF A SCENE BEING DISPLAYED ACCORDING TO TRACKED HEAD MOTION", filed on Sep. 15, 2003; U.S. patent application Ser. No. 10/759,782, entitled "METHOD AND APPARATUS FOR LIGHT INPUT DEVICE", filed on Jan. 16, 2004; U.S. patent application Ser. No. 10/820,469, entitled "METHOD AND APPARATUS TO DETECT AND REMOVE AUDIO DISTURBANCES", filed on Apr. 7, 2004; and U.S. patent application Ser. No. 11/301,673, entitled "METHOD FOR USING RELATIVE HEAD AND HAND POSITIONS TO ENABLE A POINTING INTERFACE VIA CAMERA TRACKING", filed on Dec. 12, 2005, all of which are hereby incorporated by reference.

This application is also a continuation in part (CIP) of U.S. patent application Ser. No. 11/381,729, to Xiao Dong Mao, entitled ULTRA SMALL MICROPHONE ARRAY, filed on May 4, 2006, application Ser. No. 11/381,728, to Xiao Dong Mao, entitled ECHO AND NOISE CANCELLATION, filed on May 4, 2006, U.S. patent application Ser. No. 11/381,725, to Xiao Dong Mao, entitled "METHODS AND APPARATUS FOR TARGETED SOUND DETECTION", filed on May 4, 2006, U.S. patent application Ser. No. 11/381,727, to Xiao Dong Mao, entitled "NOISE REMOVAL FOR ELECTRONIC DEVICE WITH FAR FIELD MICROPHONE ON CONSOLE", filed on May 4, 2006, U.S. patent application Ser. No. 11/381,724, to Xiao Dong Mao, entitled "METHODS AND APPARATUS FOR TARGETED SOUND DETECTION AND CHARACTERIZATION", filed on May 4, 2006, U.S. patent application Ser. No. 11/381,721, to Xiao Dong Mao, entitled "SELECTIVE SOUND SOURCE LISTENING IN CONJUNCTION WITH COMPUTER INTERACTIVE PROCESSING", filed on May 4, 2006; all of which are hereby incorporated by reference.

This application is also a continuation in part (CIP) of: co-pending application Ser. No. 11/418,988, to Xiao Dong Mao, entitled "METHODS AND APPARATUSES FOR ADJUSTING A LISTENING AREA FOR CAPTURING SOUNDS", filed on May 4, 2006; co-pending application Ser. No. 11/418,989, to Xiao Dong Mao, entitled "METHODS AND APPARATUSES FOR CAPTURING AN AUDIO SIGNAL BASED ON VISUAL IMAGE", filed on May 4, 2006; co-pending application Ser. No. 11/429,047, to Xiao Dong Mao, entitled "METHODS AND APPARATUSES FOR CAPTURING AN AUDIO SIGNAL BASED ON A LOCATION OF THE SIGNAL", filed on May 4, 2006; co-pending application Ser. No. 11/429,133, to Richard Marks et al., entitled "SELECTIVE SOUND SOURCE LISTENING IN CONJUNCTION WITH COMPUTER INTERACTIVE PROCESSING", filed on May 4, 2006; and co-pending application Ser. No. 11/429,414, to Richard Marks et al., entitled "Computer Image and Audio Processing of Intensity and Input Devices for Interfacing With A Computer Program", filed on May 4, 2006, all of the entire disclosures of which are incorporated herein by reference.

This application is also a continuation in part (CIP) of U.S. patent application Ser. No. 11/382,031, entitled "MULTI-INPUT GAME CONTROL MIXER", filed on May 6, 2006; U.S. patent application Ser. No. 11/382,032, entitled "SYSTEM FOR TRACKING USER MANIPULATIONS WITHIN AN ENVIRONMENT", filed on May 6, 2006; U.S. patent application Ser. No. 11/382,033, entitled "SYSTEM, METHOD, AND APPARATUS FOR THREE-DIMENSIONAL INPUT CONTROL", filed on May 6, 2006; U.S. patent application Ser. No. 11/382,035, entitled "INERTIALLY TRACKABLE HAND-HELD CONTROLLER", filed on May 6, 2006; U.S. patent application Ser. No. 11/382,036, entitled "METHOD AND SYSTEM FOR APPLYING GEARING EFFECTS TO VISUAL TRACKING", filed on May 6, 2006; U.S. patent application Ser. No. 11/382,041, entitled "METHOD AND SYSTEM FOR APPLYING GEARING EFFECTS TO INERTIAL TRACKING", filed on May 7, 2006; U.S. patent application Ser. No. 11/382,038, entitled "METHOD AND SYSTEM FOR APPLYING GEARING EFFECTS TO ACOUSTICAL TRACKING", filed on May 6, 2006; U.S. patent application Ser. No. 11/382,040, entitled "METHOD AND SYSTEM FOR APPLYING GEARING EFFECTS TO MULTI-CHANNEL MIXED INPUT", filed on May 7, 2006; U.S. patent application Ser. No. 11/382,034, entitled "SCHEME FOR DETECTING AND TRACKING USER MANIPULATION OF A GAME CONTROLLER BODY", filed on May 6, 2006; U.S. patent application Ser. No. 11/382,037, entitled "SCHEME FOR TRANSLATING MOVEMENTS OF A HAND-HELD CONTROLLER INTO INPUTS FOR A SYSTEM", filed on May 6, 2006; U.S. patent application Ser. No. 11/382,043, entitled "DETECTABLE AND TRACKABLE HAND-HELD CONTROLLER", filed on May 7, 2006; U.S. patent application Ser. No. 11/382,039, entitled "METHOD FOR MAPPING MOVEMENTS OF A HAND-HELD CONTROLLER TO GAME COMMANDS", filed on May 7, 2006; U.S. Design patent application Ser. No. 29/259,349, entitled "CONTROLLER WITH INFRARED PORT", filed on May 6, 2006; U.S. Design patent application Ser. No. 29/259,350, entitled "CONTROLLER WITH TRACKING SENSORS", filed on May 6, 2006; U.S. Patent Application No. 60/798,031, entitled "DYNAMIC TARGET INTERFACE", filed on May 6, 2006; and U.S. Design patent application Ser. No. 29/259,348, filed on May 6, 2006; all of which are hereby incorporated herein by reference in their entireties.

CROSS-REFERENCE TO RELATED APPLICATIONS

This application is also related to co-pending U.S. patent application Ser. No. 1/430,594, to Gary Zalewski and Riley R. Russell, entitled "Profile Detection", filed on the same day as this application, the entire disclosure of which is incorporated herein by reference.

This application is also related to co-pending U.S. patent application Ser. No. 11/430,593, to Gary Zalewski and Riley R. Russell, entitled "Using Audio/Visual Environment To Select Ads On Game Platform", filed on the same day as this application, the entire disclosure of which is incorporated herein by reference.

This application is also related to co-pending U.S. patent application Ser. No. 11/400,997, filed on Apr. 10, 2006, to Larsen and Chen, entitled "System And Method For Obtaining User Information From Voices", the entire disclosure of which is incorporated herein by reference.

This application is also related to co-pending U.S. patent application Ser. No. 11/382,259, to Gary Zalewski et al., entitled "Method and apparatus for use in determining lack of user activity in relation to a system", filed on the same day as this application, the entire disclosure of which is incorporated herein by reference.

This application is also related to co-pending U.S. patent application Ser. No. 11/382,258, to Gary Zalewski et al., entitled "Method and apparatus for use in determining an activity level of a user in relation to a system", filed on the same day as this application, the entire disclosure of which is incorporated herein by reference.

This application is also related to co-pending U.S. patent application Ser. No. 11/382,251, to Gary Zalewski et al., entitled "Hand-held controller having detectable elements for tracking purposes", filed on the same day as this application, the entire disclosure of which is incorporated herein by reference.

This application is also related to co-pending U.S. patent application Ser. No. 11/382,256, entitled "TRACKING DEVICE WITH SOUND EMITTER FOR USE IN OBTAINING INFORMATION FOR CONTROLLING GAME PROGRAM EXECUTION", filed on the same day as this application, the entire disclosure of which is incorporated herein by reference.

This application is also related to co-pending U.S. patent application Ser. No. 11/382,250, entitled "OBTAINING INPUT FOR CONTROLLING EXECUTION OF A GAME PROGRAM", filed on the same day as this application, the entire disclosure of which is incorporated herein by reference.

This application is also related to co-pending U.S. Design patent application Ser. No. 29/246,744, entitled "VIDEO GAME CONTROLLER FRONT FACE", filed on the same day as this application, the entire disclosure of which is incorporated herein by reference.

This application is also related to co-pending U.S. Design patent application Ser. No. 29/246,743, entitled "VIDEO GAME CONTROLLER", filed on the same day as this application, the entire disclosure of which is incorporated herein by reference.

This application is also related to co-pending U.S. Design patent application Ser. No. 29/246,767, entitled "VIDEO GAME CONTROLLER", filed on the same day as this application, the entire disclosure of which is incorporated herein by reference.

This application is also related to co-pending U.S. Design patent application Ser. No. 29/246,763, entitled "VIDEO GAME CONTROLLER", filed on the same day as this application, the entire disclosure of which is incorporated herein by reference.

This application is also related to co-pending U.S. Design patent application Ser. No. 29/246,759, entitled "ERGONOMIC GAME CONTROLLER DEVICE WITH LEDS AND OPTICAL PORTS", filed on the same day as this application, the entire disclosure of which is incorporated herein by reference.

This application is also related to co-pending U.S. Design patent application Ser. No. 29/246,765, entitled "GAME CONTROLLER DEVICE WITH LEDS AND OPTICAL PORTS", filed on the same day as this application, the entire disclosure of which is incorporated herein by reference.

This application is also related to co-pending U.S. Design patent application Ser. No. 29/246,765, entitled "DESIGN FOR OPTICAL GAME CONTROLLER INTERFACE", filed on the same day as this application, the entire disclosure of which is incorporated herein by reference.

This application is also related to co-pending U.S. Design patent application Ser. No. 29/246,766, entitled "DUAL GRIP GAME CONTROL DEVICE WITH LEDS AND OPTICAL PORTS", filed on the same day as this application, the entire disclosure of which is incorporated herein by reference.

This application is also related to co-pending U.S. Design patent application Ser. No. 29/246,764, entitled "GAME INTERFACE DEVICE WITH LEDS AND OPTICAL PORTS", filed on the same day as this application, the entire disclosure of which is incorporated herein by reference.

This application is also related to co-pending U.S. Design patent application Ser. No. 29/246,762, entitled "ERGONOMIC GAME INTERFACE DEVICE WITH LEDS AND OPTICAL PORTS", filed on the same day as this application, the entire disclosure of which is incorporated herein by reference.

FIELD OF THE INVENTION

The present invention relates generally to computer entertainment systems, and more specifically to a user's manipulation of a controller for such computer entertainment systems.

BACKGROUND OF THE INVENTION

Computer entertainment systems typically include a hand-held controller, game controller, or other controller. A user or player uses the controller to send commands or other instructions to the entertainment system to control a video game or other simulation being played. For example, the controller may be provided with a manipulator which is operated by the user, such as a joy stick. The manipulated variable of the joy stick is converted from an analog value into a digital value, which is sent to the game machine main frame. The controller may also be provided with buttons that can be operated by the user.

It is with respect to these and other background information factors that the present invention has evolved.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Various embodiments of the methods, apparatus, schemes and systems described herein provide for the detection, capture and tracking of the movements, motions and/or manipulations of the entire controller body itself by the user. The detected movements, motions and/or manipulations of the entire controller body by the user may be used as additional commands to control various aspects of the game or other simulation being played.

Detecting and tracking a user's manipulations of a game controller body may be implemented in different ways. For example, in some embodiments an inertial sensor, such as an accelerometer or gyroscope, can be used with the computer entertainment system to detect motions of the hand-held controller body and transfer them into actions in a game. The inertial sensor can be used to detect many different types of motions of the controller, such as for example up and down movements, twisting movements, side to side movements, jerking movements, wand-like motions, plunging motions, etc. Such motions may correspond to various commands such that the motions are transferred into actions in a game.

Detecting and tracking the user's manipulations of a game controller body can be used to implement many different types of games, simulations, etc., that allow the user to, for example, engage in a sword or lightsaber fight, use a wand to trace the shape of items, engage in many different types of sporting events, engage in on-screen fights or other encounters, etc.

Figure 1:
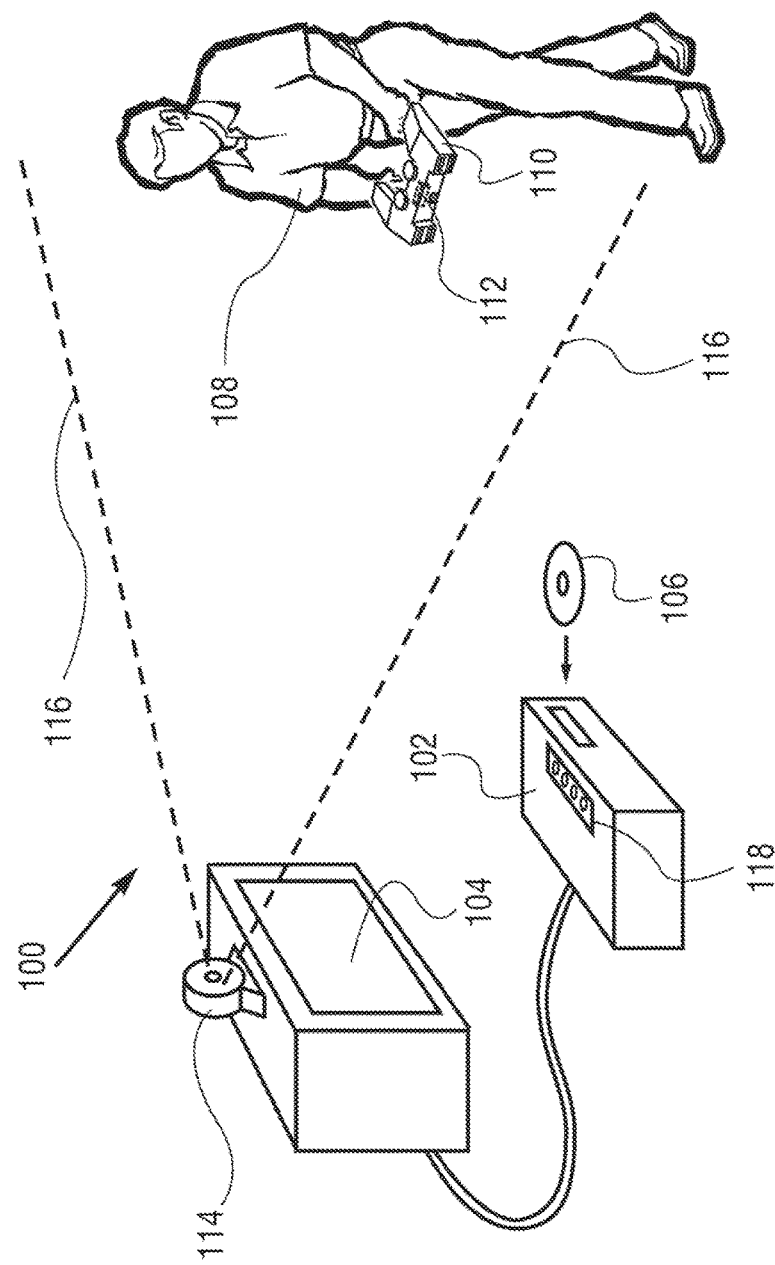
FIG. 1 is a pictorial diagram illustrating a video game system that operates in accordance with an embodiment of the present invention.
Figure 2:
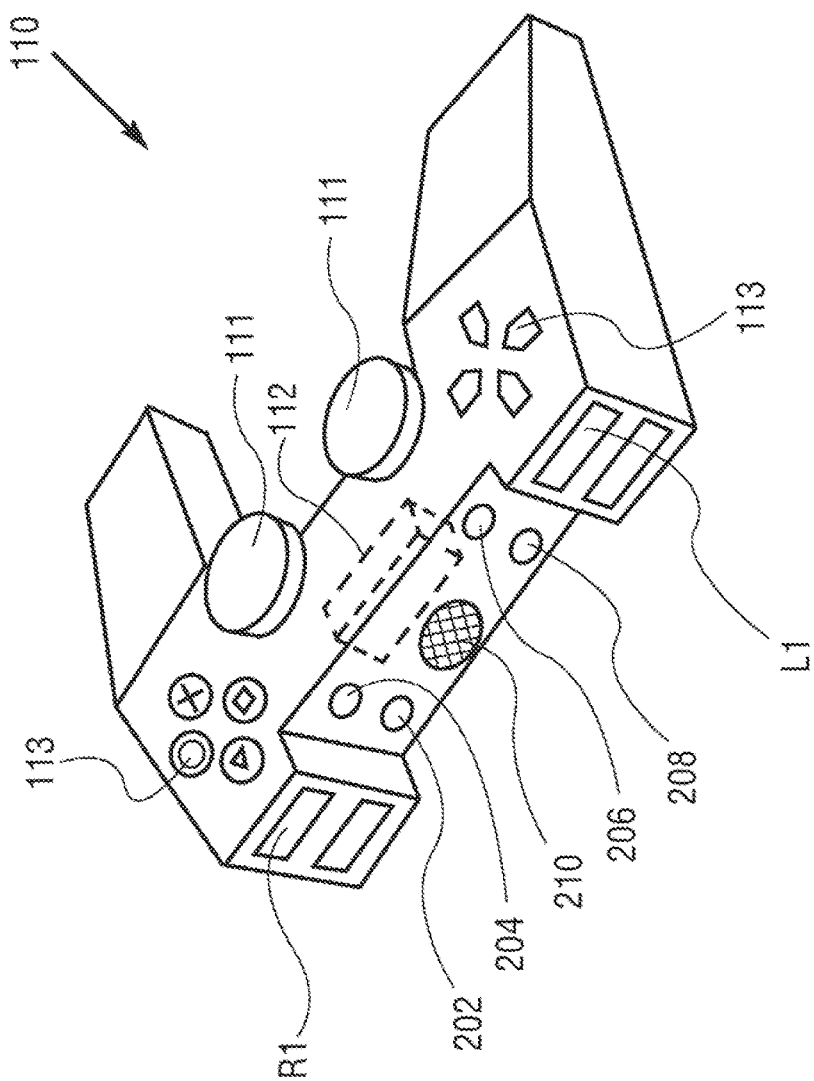
FIG. 2 is a perspective view of a controller made in accordance with an embodiment of the present invention.

Referring to FIG. 1, there is illustrated a system 100 that operates in accordance with an embodiment of the present invention. As illustrated, a computer entertainment console 102 may be coupled to a television or other video display 104 to display the images of the video game or other simulation thereon. The game or other simulation may be stored on a DVD, CD, flash memory, USB memory, or other memory media 106 that is inserted into the console 102. A user or player 108 manipulates a game controller 110 to control the video game or other simulation. As seen in FIG. 2, the game controller 110 includes an inertial sensor 112 that produces signals in response to the position, motion, orientation or change in orientation of the game controller 110. In addition to the inertial sensor, the game controller 110 may include conventional control input devices, e.g., joysticks 111, buttons 113, R1, L1, and the like.

During operation, the user 108 physically moves the controller 110. For example, the controller 110 may be moved in any direction by the user 108, such as up, down, to one side, to the other side, twisted, rolled, shaken, jerked, plunged, etc. These movements of the controller 110 itself may be detected and captured by a video image capturing device 114 by way of tracking through analysis of signals from the inertial sensor 112 in a manner described below.

Referring again to FIG. 1, the system 100 may optionally include a camera or other video image capturing device 114, which may be positioned so that the controller 110 is within the camera's field of view 116. Analysis of images from the image capturing device 114 may be used in conjunction with analysis of data from the inertial sensor 112. As shown in FIG. 2, the controller may optionally be equipped with light sources such as light emitting diodes (LEDs) 202, 204, 206, 208 to facilitate tracking by video analysis. Analysis of such video images for the purpose of tracking the controller 110 are described, e.g., in U.S. patent application Ser. No. 11/382,034, entitled "SCHEME FOR DETECTING AND TRACKING USER MANIPULATION OF A GAME CONTROLLER BODY", which is incorporated herein by reference. The controller 110 may include a microphone array 118 and the controller 110 may also include an acoustic signal generator 210 (e.g., a speaker) to provide a source of sound to facilitate acoustic tracking of the controller 110 with the microphone array 118 and appropriate acoustic signal processing, e.g., as described in U.S. patent application Ser. No. 11/381,724, which is incorporated herein by reference.

In general, signals from the inertial sensor 112 are used to generate position and orientation data for the controller 110. Such data may be used to calculate many physical aspects of the movement of the controller 110, such as for example its acceleration and velocity along any axis, its tilt, pitch, yaw, roll, as well as any telemetry points of the controller 110. As used herein, telemetry generally refers to remote measurement and reporting of information of interest to a system or to the system's designer or operator.

The ability to detect and track the movements of the controller 110 makes it possible to determine whether any predefined movements of the controller 110 are performed. That is, certain movement patterns or gestures of the controller 110 may be predefined and used as input commands for the game or other simulation. For example, a plunging downward gesture of the controller 110 may be defined as one command, a twisting gesture of the controller 110 may be defined as another command, a shaking gesture of the controller 110 may be defined as another command, and so on. In this way the manner in which the user 108 physically moves the controller 110 is used as another input for controlling the game, which provides a more stimulating and entertaining experience for the user.

Figure 3A:
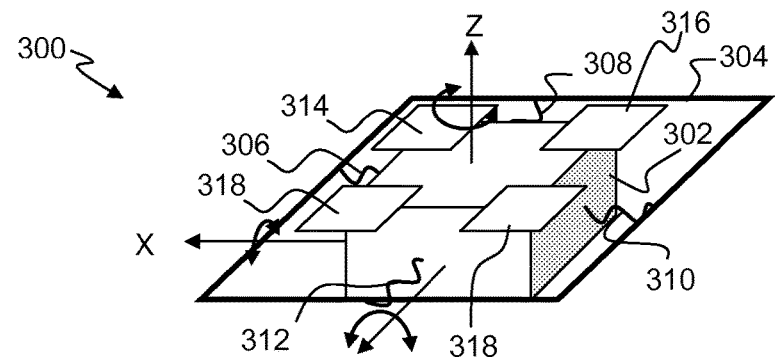
FIG. 3A is a three-dimensional schematic diagram illustrating an accelerometer that may be used in a controller according to an embodiment of the present invention.

By way of example and without limitation, the inertial sensor 112 may be an accelerometer. FIG. 3A depicts an example of an accelerometer 300 in the form of a simple mass 302 elastically coupled at four points to a frame 304, e.g., by springs 306, 308, 310, 312. Pitch and roll axes (indicated by X and Y, respectively) lie in a plane that intersects the frame. A yaw axis Z is oriented perpendicular to the plane containing the pitch axis X and the roll axis Y. The frame 304 may be mounted to the controller 110 in any suitable fashion. As the frame 304 (and the joystick controller 110) accelerates and/or rotates the mass 302 may displace relative to the frame 304 and the springs 306, 208, 310, 312 may elongate or compress in a way that depends on the amount and direction of translational and/or rotational acceleration and/or the angle of pitch and/or roll and/or yaw. The displacement and of the mass 302 and/or compression or elongation of the springs 306, 308, 310, 312 may be sensed, e.g., with appropriate displacement sensors 314, 316, 318, 320 and converted to signals that depend in known or determinable way on the amount acceleration of pitch and/or roll.

There are a number of different ways to track the position of the mass and/or or the forces exerted on it, including resistive strain gauge material, photonic sensors, magnetic sensors, hall-effect devices, piezoelectric devices, capacitive sensors, and the like. Embodiments of the invention may include any number and type or combination of types of sensors. By way of example, and without limitation, the displacement sensors 314, 316, 318, 320 may be gap closing electrodes placed above the mass 302. A capacitance between the mass and each electrode changes as the position of the mass changes relative to each electrode. Each electrode may be connected to a circuit that produce a signal related to the capacitance (and therefore to the proximity) of the mass 302 relative to the electrode. In addition, the springs 306, 308, 310, 312 may include resistive strain gauge sensors that produce signals that are related to the compression or elongation of the springs. The displacement sensors 314, 316, 318, 320 may be positioned such that a first combination of displacement signals from the two or more displacement sensors can be analyzed to determine an orientation of the frame with respect to one of the two or more different axes and a second combination of displacement signals from the two or more displacement sensors can be analyzed to determine a motion of the frame with respect to the same one or a different one of the two or more different axes In some embodiments, the frame 304 may be gimbal mounted to the controller 110 so that the accelerometer 300 maintains a fixed orientation with respect to the pitch and/or roll and/or yaw axes. In such a manner, the controller axes X, Y, Z may be directly mapped to corresponding axes in real space without having to take into account a tilting of the controller axes with respect to the real space coordinate axes.

Figure 3B:
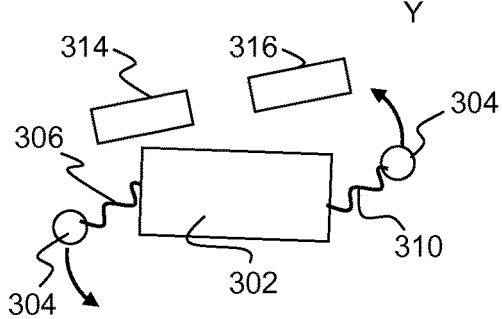
FIG. 3B is a cross-sectional schematic diagram illustrating the accelerometer of FIG. 3A in a state of rotation about a pitch or roll axis.
Figure 3C:
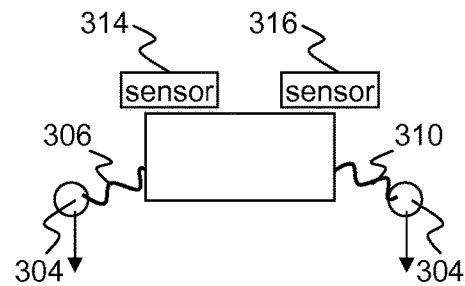
FIG. 3C is a cross-sectional schematic diagram illustrating the accelerometer of FIG. 3A in a state of translational acceleration.
Figure 3D:
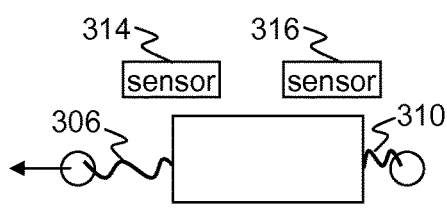
FIG. 3D is a top plan view schematic diagram illustrating the accelerometer of FIG. 3A in a state of rotational acceleration about a yaw axis.
Figure 3E:
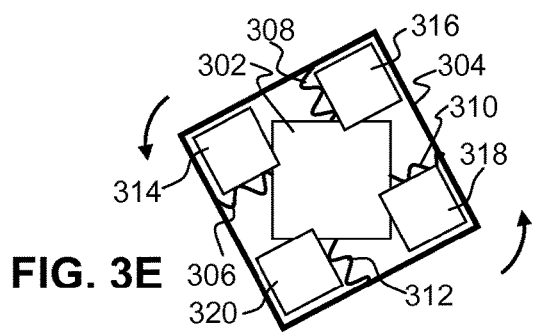
FIG. 3E is a top plan view schematic diagram illustrating the accelerometer of FIG. 3A in a state of rotational acceleration about a yaw axis.

FIGS. 3B-3D illustrate examples of different elongation and compressions for the springs 306, 308, 310, 312 under different conditions of acceleration and/or rotation. Specifically, FIG. 3B depicts a situation wherein the frame 304 has been rotated about the Y axis. Due to the force of gravity acting the mass 302, the springs 306, 310 are elongated and the mass 302 is brought closer to sensors 314, 318 and further away from sensors 316, 320. Rotation about the Y (roll) axis in the opposite sense would similarly elongate the springs 306, 310, but would bring the mass closer to sensors 316, 320 and further from sensors 314, 318. Similarly, rotation about the X (pitch) axis could elongate springs 308, 312 and bring the mass closer to sensors 314, 316 and further from sensors 318, 320, depending on the direction of rotation.

FIG. 3C depicts a situation in which the frame 304 has been accelerated sharply downwards (as indicated by the arrows) while remaining level. In this situation all four springs 306, 308, 310, 312 elongate and the mass is brought closer to all four sensors 314, 316, 318, 320. In FIG. 3D the frame 304 is accelerated to the left (as indicated by the arrow) while remaining level. In this situation, springs 306, 308, and 312 elongate while spring 310 is compressed. The mass 302 moves away from sensors 314, 318 and closer to sensors 316, 320. FIG. 3D depicts a situation in which the frame 304 has been given an angular acceleration about the Z (yaw) axis produces an elongation of all four springs 306, 308, 310, 312 and moves the mass 302 away from all four sensors 314, 316, 318, 320. As may be seen from FIGS. 3B-3E, different motions and/or orientations of the frame 304 therefore produce particular combinations of signals that may be analyzed to determine the orientation and/or motion of the frame 304 (and the controller 110).

In the absence of external forces acting on the mass 302 the displacement of the mass 302 from a rest position along the Z axis is roughly proportional to the amount of acceleration along the Z axis. The sensors 314, 316, 318, 320 produce signals that are proportional to the displacement of the mass 302 and are, therefore, proportional to the acceleration of the frame 304 (and controller 110) along the Z axis. In a similar fashion, signals from the sensors may be used to deduce acceleration along the X and Y axes. It is noted that, in the force of gravity may act on the mass 302 and the sensors 314, 316, 318, 320 may produce non-zero signals. For example in a rest state, with no pitch or roll applied to the joystick controller, the Z axis may be aligned with the vertical axis (as determined by the force of gravity). Gravity may displace the mass 302, from a position it would otherwise have assumed in the absence of gravity. As a result the displacement sensors produce some non-zero signal $V_0$, which is referred to herein as a "zero-point" acceleration signal. The zero-point acceleration signal $V_0$ is typically subtracted from the accelerometer signal V before analyzing the raw signals from the sensors 314, 316, 318, 320.

Figure 4:
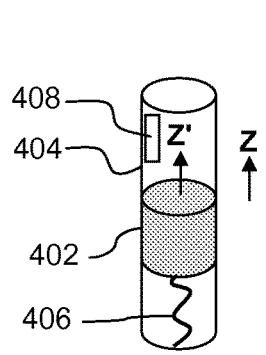
FIG. 4 is a three-dimensional schematic diagram illustrating correction of an orientation dependent zero-point accelerometer signal in accordance with an embodiment of the present invention.
Figure 4:
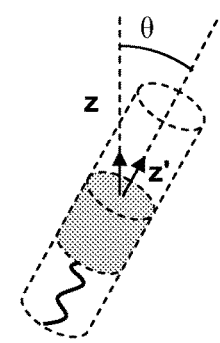

If the frame 304 (and the controller 110) remains in the same orientation with respect to pitch and roll the zero-point acceleration signal $V_0$ is constant. However, the zero-point acceleration signal $V_0$ may be dependent on the amount of rotation about the pitch and roll axes. Embodiments of the present invention may take into account the effects of pitch and roll on the zero-point acceleration signal $V_0$. For example, FIG. 4 illustrates the situation with respect to a single axis accelerometer 400 having a mass 402 constrained to move in a tube 404 along a tube axis Z. A spring 406 connects the mass 402 to an end-cap of the tube 404. A sensor 408, e.g., a capacitance sensor as described above. If the tube axis Z is tilted (as shown in phantom) with respect to a vertical direction Z' by an angle θ due to pitch and roll of the tube 404, a "rotated" zero-point acceleration signal $V_0'$ may be expected to be related to $V_0$ and θ as:

$$V_0' = V_0 \cos \theta.$$

Note that in the extreme case of θ=90 degrees, $V_0'=0$.

The angle θ generally depends on the angles of pitch and roll. These may be determined from signals from separate sensors. A unit vector z directed along the tube axis Z may be constructed from known absolute values of pitch and roll relative to a known initial orientation, e.g., one in which the accelerometer axis is aligned with a unit vector z directed along the vertical axis. It is noted that the initial orientation may be any orientation of the joystick controller that produces a stable signal from the accelerometer 400. A dot product between the unit vectors z and z' gives the cosine of the angle θ between them. This dot product may be multiplied by the zero-point signal $V_O$ to provide the desired correction factor, which may then be subtracted from the acceleration signal obtained from the sensor 408.

It is noted that in embodiments of the present sensor various types of inertial sensor devices may be used to provide information on 6-degrees of freedom (e.g., X, Y and Z translation and rotation about X, Y and Z axes). Examples of suitable inertial sensors for providing information on 6-degrees of freedom include accelerometers of the type shown in FIG. 3A, one or more single axis accelerometers, mechanical gyroscopes, ring laser gyroscopes or combinations of two or more of these.

Figure 5A:
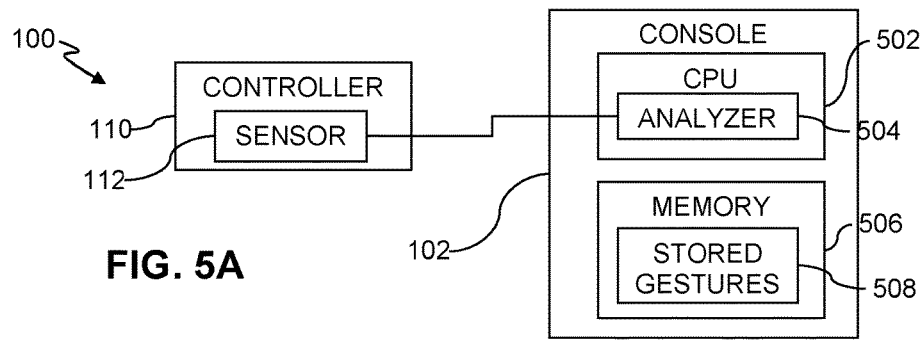
FIG. 5A is a block diagram of a portion of the video game system of FIG. 1.

Signals from the sensor may be analyzed to determine the motion and/or orientation of the controller during play of a video game according to an inventive method. Such a method may be implemented as a series of processor executable program code instructions stored in a processor readable medium and executed on a digital processor. For example, as depicted in FIG. 5A, the video game system 100 may include on the console 102 a processor 502. The processor may be any suitable digital processor unit, e.g., a microprocessor of a type commonly used in video game consoles. The processor may implement an inertial analyzer 504 through execution of processor readable instructions. A portion of the instructions may be stored in a memory 506. Alternatively, the inertial analyzer 504 may be implemented in hardware, e.g., as an application specific integrated circuit (ASIC). Such analyzer hardware may be located on the controller 110 or on the console 102 or may be remotely located elsewhere. In hardware implementations, the analyzer 504 may be programmable in response to external signals e.g., from the processor 502 or some other remotely located source, e.g., connected by USB cable, wireless connection, or over a network.

The inertial analyzer 504 may include or implement instructions that analyze the signals generated by the inertial sensor 112 and utilize information regarding position and/or orientation of the controller 110. For example, as shown in the flow diagram 510 of FIG. 5B signals may be generated by the inertial sensor 112 as indicated at block 512. The inertial sensor signals may be analyzed to determine information regarding the position and/or orientation of the controller 110 as indicated at block 514. The position and or orientation information may be utilized during play of a video game with the system 100 as indicated at block 516.

In certain embodiments, the position and/or orientation information may be used in relation to gestures made by the user 108 during game play. As indicated in the flow diagram 520 of FIG. 5C, a path of the controller 110 may be tracked using the position and/or orientation information as indicated at block 522. By way of example, and without limitation, the path may include a set of points representing a position of the center of mass of the controller with respect to some system of coordinates. Each position point may be represented by one or more coordinates, e.g., X, Y and Z coordinates in a Cartesian coordinate system. A time may be associated with each point on the path so that both the shape of the path and the progress of the controller along the path may be monitored. In addition, each point in the set may have associated with it data representing an orientation of the controller, e.g., one or more angles of rotation of the controller about its center of mass. Furthermore, each point on the path may have associated with it values of velocity and acceleration of the center of mass of the controller and rates of angular rotation and angular acceleration of the controller about its center of mass.

As indicated at block 524, the tracked path may be compared to one or more stored gestures 508 corresponding to known paths and/or pre-recorded gestures that are relevant to the context of the video game being played. The analyzer 504 may be configured to recognize a user or process audio authenticated gestures, etc. For example, a user may be identified by an the analyzer 504 through a gesture and that a gesture may be specific to a user. Such a specific gestures may be recorded and included among the stored gestures 508 stored in memory 506. The recordation process may optionally store audio generated during recordation of a gesture. The sensed environment is sampled into a multi-channel analyzer and processed. The processor may reference gesture models to determine and authenticate and/or identify a user or objects based on voice or acoustic patterns and to a high degree of accuracy and performance.

As indicated in FIG. 5A, the gestures may be stored in the memory 506. Examples of gestures include, but are not limited to throwing an object such as a ball, swinging an object such as a bat or golf club, pumping hand pump, opening or closing a door or window, turning steering wheel or other vehicle control, martial arts moves such as punches, sanding movements, wax on wax off, paint the house, shakes, rattles, rolls, football pitches, turning knob movements, 3D MOUSE movements, scrolling movements, movements with known profiles, any recordable movement, movements along any vector back and forth i.e. pump the tire but at some arbitrary orientation in space, movements along a path, movements having precise stop and start times, any time based user manipulation that can be recorded, tracked and repeated within the noise floor, splines, and the like. Each of these gestures may be pre-recorded from path data and stored as a time-based model. Comparison of the path and stored gestures may start with an assumption of a steady state if the path deviates from a steady state the path can be compared to the stored gestures by a process of elimination. If at block 526 there is no match, the analyzer 504 may continue tracking the path of the controller 110 at block 522. If there is a sufficient match between the path (or a portion thereof) and a stored gesture the state of the game may be changed as indicated at 528. Changes of state of the game may include, but are not limited to interrupts, sending control signals, changing variables, etc.

Here is one example of this can occur. Upon determining that the controller 110 has left a steady state the path the analyzer 504 tracks movement of the controller 110. As long as the path of the controller 110 complies with a path defined in the stored gestures 508, those gestures are possible "hits". If the path of the controller 110 deviates (within the noise tolerance setting) from any stored gesture 508, that gesture model is removed from the hit list. Each gesture reference model includes a time-base in which the gesture is recorded. The analyzer 504 compares the controller path data to the stored gestures 508 at the appropriate time index. Occurrence of a steady state condition resets the clock. When deviating from steady state (i.e. when movements are tracked outside of the noise threshold) the hit list is populated with all potential gesture models. The clock is started and movements of the controller are compared against the hit list. Again, the comparison is a walk through time. If any gesture in the hit list reaches the end of the gesture then it is a hit.

In certain embodiments, the analyzer 504 may inform a game program when certain events occur. Examples of such events include the following:

INTERRUPT ZERO-ACCELERATION POINT REACHED (X AND/OR Y AN/OR Z AXIS) In certain game situations the analyzer 504 may notify or interrupt routine within the game program when acceleration of the controller changes at the inflection points. For example, the user 108 may use the controller 110 to control a game avatar representing a quarterback in a football simulation game. The analyzer 504 may track the controller (representing the football) via a path generated from signals from the inertial sensor 112. A particular change in acceleration of the controller 110 may signal release of the football. At this point, the analyzer may trigger another routine within the program (e.g., a physics simulation package) to simulate the trajectory of the football based on the position, and/or velocity and/or orientation of the controller at the point of release.

INTERRUPT NEW GESTURE RECOGNIZED

In addition, the analyzer 502 may be configured by one or more inputs. Examples of such inputs include, but are not limited to:

SET NOISE LEVEL (X, Y or Z AXIS) The noise level may be a reference tolerance used when analyzing jitter of the user's hands in the game.

SET SAMPLING RATE. As used herein, the sampling rate may refer to how often the analyzer 502 samples the signals from the inertial sensor. The sampling rate may be set to oversample or average the signal.

SET GEARING. As used herein gearing generally refers to the ratio of controller movements to movements occurring within the game. Examples of such "gearing" in the context of control of a video game may be found in U.S. patent application Ser. No. 11/382,040, filed May 7, 2006, which is incorporated herein by reference.

SET MAPPING CHAIN. As used herein, a mapping chain refers to a map of gesture models. The gesture model maps can be made for a specific input Channel (e.g., for path data generated from inertial sensor signals only) or for a hybrid Channel formed in a mixer unit. Three input Channels may be served by two or more different Analyzers that are similar to the inertial analyzer 504. Specifically, these may include: the inertial analyzer 504 as described herein, a video analyzer as described e.g., in U.S. patent application Ser. No. 11/382,034, entitled SCHEME FOR DETECTING AND TRACKING USER MANIPULATION OF A GAME CONTROLLER BODY, which is incorporated herein by reference, and an Acoustic Analyzer, e.g., as described in U.S. patent application Ser. No. 11/381,721, which is incorporated herein by reference. The Analyzers can be configured with a mapping chain. Mapping chains can be swapped out by the game during gameplay as can settings to the Analyzer and to the Mixer. Referring to again to FIG. 5B, block 512, those of skill in the art will recognize that there are numerous ways to generate signals from the inertial sensor 112. A few examples, among others have been described above with respect to FIGS. 3A-3E. Referring to block 504, there are numerous ways to analyze the sensor signals generated in block 502 to obtain information relating to the position and/or orientation of the controller 110. By way of example and without limitation the position and/or orientation information may include, but is not limited to information regarding the following parameters individually or in any combination:

CONTROLLER ORIENTATION. Orientation of the controller 110 may be expressed in terms of pitch, roll or yaw angle with respect to some reference orientation, e.g., in radians). Rates of change of controller orientation (e.g., angular velocities or angular accelerations) may also be included in the position and/or orientation information. Where the inertial sensor 112 includes a gyroscopic sensor controller orientation information may be obtained directly in the form of one or more output values that are proportional to angles of pitch, roll or yaw.

CONTROLLER POSITION (e.g., Cartesian coordinates X,Y,Z of the controller 110 in some frame of reference)

CONTROLLER X-AXIS VELOCITY

CONTROLLER Y-AXIS VELOCITY

CONTROLLER Z-AXIS VELOCITY

CONTROLLER X-AXIS ACCELERATION

CONTROLLER Y-AXIS ACCELERATION

CONTROLLER Z-AXIS ACCELERATION

It is noted that with respect to position, velocity and acceleration the position and/or orientation information may be expressed in terms of coordinate systems other than Cartesian. For example, cylindrical or spherical coordinates may be used for position, velocity and acceleration. Acceleration information with respect to the X, Y and Z axes may be obtained directly from an accelerometer type sensor, e.g., as described above with respect to FIGS. 3A-3E. The X, Y and Z accelerations may be integrated with respect to time from some initial instant to determine changes in X, Y and Z velocities. These velocities may be computed by adding the velocity changes to known values of the X-, Y-, and Z-velocities at the initial instant in time. The X, Y and Z velocities may be integrated with respect to time to determine X-, Y-, and Z-displacements of the controller. The X-, Y-, and Z-positions may be determined by adding the displacements to known X-, Y-, and Z-, positions at the initial instant.

STEADY STATE Y/N—This particular information indicates whether the controller is in a steady state, which may be defined as any position, which may be subject to change too. In a preferred embodiment the steady state position may be one wherein the controller is held in a more or less level orientation at a height roughly even with a user's waist.

TIME SINCE LAST STEADY STATE generally refers to data related to how long a period of time has passed since a steady state (as referenced above) was last detected. That determination of time may, as previously noted, be calculated in real-time, processor cycles, or sampling periods. The Time Since Last Steady State data time may be important with regard to resetting tracking of a controller with regard to an initial point to ensure accuracy of character or object mapping in a game environment. This data may also be important with regard to determining available actions/gestures that might be subsequently executed in a game environment (both exclusively and inclusively).

LAST GESTURE RECOGNIZED generally refers to the last gesture recognized either by a gesture recognition engine (which may be implemented in hardware or software. The identification of a last gesture recognized may be important with respect to the fact that a previous gesture may be related to the possible gestures that may be subsequently recognized or some other action that takes place in the game environment.

TIME LAST GESTURE RECOGNIZED

The above outputs can be sampled at any time by a game program or software.

According to embodiments of the present invention, a video game system and method of the type described above may be implemented as depicted in FIG. 6. A video game system 600 may include a processor 601 and a memory 602 (e.g., RAM, DRAM, ROM, and the like). In addition, the video game system 600 may have multiple processors 601 if parallel processing is to be implemented. The memory 602 includes data and a program 604, which may include portions that are configured as described above. Specifically, the memory 602 may include inertial signal data 606 which may include stored controller path information as described above. The memory 602 may also contain stored gesture data 608, e.g., data representing one or more gestures relevant to the program 604.

Figure 6:
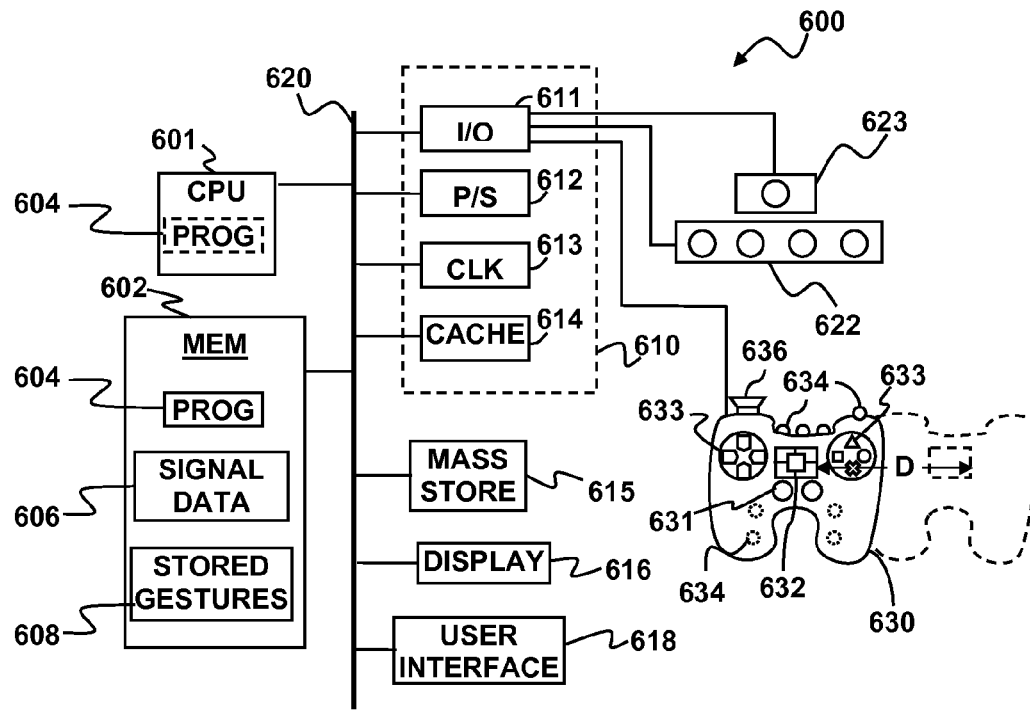
FIG. 6 is a block diagram illustrating a video game system according to an embodiment of the present invention.

The video game system 600 may also include well-known support functions 610, such as input/output (I/O) elements 611, power supplies (P/S) 612, a clock (CLK) 613 and cache 614. The apparatus 600 may optionally include a mass storage device 615 such as a disk drive, CD-ROM drive, tape drive, or the like to store programs and/or data. The controller may also optionally include a display unit 616 and user interface unit 618 to facilitate interaction between the video game system 600 and a user. The display unit 616 may be in the form of a cathode ray tube (CRT) or flat panel screen that displays text, numerals, graphical symbols or images. The user interface 618 may include a keyboard, mouse, joystick, light pen or other device. In addition, the user interface 618 may include a microphone, video camera or other signal transducing device to provide for direct capture of a signal to be analyzed. The processor 601, memory 602 and other components of the video game system 600 may exchange signals (e.g., code instructions and data) with each other via a system bus 620 as shown in FIG. 6.

A microphone array 622 may be coupled to the video game system 600 through the I/O functions 611. The microphone array may include between about 2 and about 8 microphones, preferably about 4 microphones with neighboring microphones separated by a distance of less than about 4 centimeters, preferably between about 1 centimeter and about 2 centimeters. Preferably, the microphones in the array 622 are omni-directional microphones. An optional image capture unit 623 (e.g., a digital camera) may be coupled to the apparatus 600 through the I/O functions 611. One or more pointing actuators 625 that are mechanically coupled to the camera may exchange signals with the processor 601 via the I/O functions 611.

As used herein, the term I/O generally refers to any program, operation or device that transfers data to or from the video game system 600 and to or from a peripheral device. Every data transfer may be regarded as an output from one device and an input into another. Peripheral devices include input-only devices, such as keyboards and mouses, output-only devices, such as printers as well as devices such as a writable CD-ROM that can act as both an input and an output device. The term "peripheral device" includes external devices, such as a mouse, keyboard, printer, monitor, microphone, game controller, camera, external Zip drive or scanner as well as internal devices, such as a CD-ROM drive, CD-R drive or internal modem or other peripheral such as a flash memory reader/writer, hard drive.

In certain embodiments of the invention, the video game system 600 may be a video game unit, which may include a controller 630 coupled to the processor via a communications interface, such as the I/O functions 611 either through wires (e.g., a USB controller or universal asynchronous receiver transmitter (UART)) or wirelessly. In some embodiments the joystick controller 630 may be mountable to a user's body. The controller 630 may have analog joystick controls 631 and conventional buttons 633 that provide control signals commonly used during playing of video games. Such video games may be implemented as processor readable data and/or instructions from the program 604 which may be stored in the memory 602 or other processor readable medium such as one associated with the mass storage device 615.

The joystick controls 631 may generally be configured so that moving a control stick left or right signals movement along the X axis, and moving it forward (up) or back (down) signals movement along the Y axis. In joysticks that are configured for three-dimensional movement, twisting the stick left (counter-clockwise) or right (clockwise) may signal movement along the Z axis. These three axis—X Y and Z—are often referred to as roll, pitch, and yaw, respectively, particularly in relation to an aircraft.

In addition to conventional features, a tracking device incorporated into the controller 630 may include one or more inertial sensor units 632 having a single mass, which may provide position and/or orientation information to the processor 601 via inertial signals, e.g., displacement signals as described above with respect to FIGS. 3A-3E. Orientation information may include angular information such as a tilt, roll or yaw of the controller 630. By way of example, the inertial sensors 632 may include any number and/or combination of accelerometers, gyroscopes or tilt sensors. In a preferred embodiment, the inertial sensors 632 include tilt sensors adapted to sense orientation of the joystick controller with respect to tilt and roll axes, a first accelerometer adapted to sense acceleration along a yaw axis and a second accelerometer adapted to sense angular acceleration with respect to the yaw axis. An accelerometer may be implemented, e.g., as a MEMS device including a mass mounted by one or more springs with sensors for sensing displacement of the mass relative to one or more directions. Signals from the sensors that are dependent on the displacement of the mass may be used to determine an acceleration of the joystick controller 630. Such techniques may be implemented by instructions from the game program 604 which may be stored in the memory 602 and executed by the processor 601.

By way of example an accelerometer suitable as the inertial sensor 632 may be a simple mass elastically coupled at three or four points to a frame, e.g., by springs. Pitch and roll axes lie in a plane that intersects the frame, which is mounted to the joystick controller 630. As the frame (and the joystick controller 630) rotates about pitch and roll axes the mass will displace under the influence of gravity and the springs will elongate or compress in a way that depends on the angle of pitch and/or roll. The displacement and of the mass can be sensed and converted to a signal that is dependent on the amount of pitch and/or roll. Angular acceleration about the yaw axis or linear acceleration along the yaw axis may also produce characteristic patterns of compression and/or elongation of the springs or motion of the mass that can be sensed and converted to signals that are dependent on the amount of angular or linear acceleration. Such an accelerometer device can measure tilt, roll angular acceleration about the yaw axis and linear acceleration along the yaw axis by tracking movement of the mass or compression and expansion forces of the springs. There are a number of different ways to track the position of the mass and/or or the forces exerted on it, including resistive strain gauge material, photonic sensors, magnetic sensors, hall-effect devices, piezoelectric devices, capacitive sensors, and the like. In some embodiments, the inertial sensor 632 may be removably mounted to a "body" of the joystick controller 630.

In addition, the joystick controller 630 may include one or more light sources 634, such as light emitting diodes (LEDs). The light sources 634 may be used to distinguish one controller from the other. For example one or more LEDs can accomplish this by flashing or holding an LED pattern code. By way of example, 5 LEDs can be provided on the joystick controller 630 in a linear or two-dimensional pattern. Although a linear array of LEDs is preferred, the LEDs may alternatively, be arranged in a rectangular pattern or an arcuate pattern to facilitate determination of an image plane of the LED array when analyzing an image of the LED pattern obtained by the image capture unit 623. Furthermore, the LED pattern codes may also be used to determine the positioning of the joystick controller 630 during game play. For instance, the LEDs can assist in identifying tilt, yaw and roll of the controllers. This detection pattern can assist in providing a better user/feel in games, such as aircraft flying games, etc. The image capture unit 623 may capture images containing the joystick controller 630 and light sources 634. Analysis of such images can determine the location and/or orientation of the joystick controller. Such analysis may be implemented by the program 604 stored in the memory 602 and executed by the processor 601. To facilitate capture of images of the light sources 634 by the image capture unit 623, the light sources 634 may be placed on two or more different sides of the joystick controller 630, e.g., on the front and on the back (as shown in phantom). Such placement allows the image capture unit 623 to obtain images of the light sources 634 for different orientations of the joystick controller 630 depending on how the joystick controller 630 is held by a user.

In addition the light sources 634 may provide telemetry signals to the processor 601, e.g., in pulse code, amplitude modulation or frequency modulation format. Such telemetry signals may indicate which joystick buttons are being pressed and/or how hard such buttons are being pressed. Telemetry signals may be encoded into the optical signal, e.g., by pulse coding, pulse width modulation, frequency modulation or light intensity (amplitude) modulation. The processor 601 may decode the telemetry signal from the optical signal and execute a game command in response to the decoded telemetry signal. Telemetry signals may be decoded from analysis of images of the joystick controller 630 obtained by the image capture unit 623. Alternatively, the apparatus 600 may include a separate optical sensor dedicated to receiving telemetry signals from the lights sources 634. The use of LEDs in conjunction with determining an intensity amount in interfacing with a computer program is described, e.g., in U.S. patent application Ser. No. 11/429,414, to Richard L. Marks et al., entitled "USE OF COMPUTER IMAGE AND AUDIO PROCESSING IN DETERMINING AN INTENSITY AMOUNT WHEN INTERFACING WITH A COMPUTER PROGRAM", filed May 4, 2006, which is incorporated herein by reference in its entirety. In addition, analysis of images containing the light sources 634 may be used for both telemetry and determining the position and/or orientation of the joystick controller 630. Such techniques may be implemented by instructions of the program 604 which may be stored in the memory 602 and executed by the processor 601.

The processor 601 may use the inertial signals from the inertial sensor 632 in conjunction with optical signals from light sources 634 detected by the image capture unit 623 and/or sound source location and characterization information from acoustic signals detected by the microphone array 622 to deduce information on the location and/or orientation of the controller 630 and/or its user. For example, "acoustic radar" sound source location and characterization may be used in conjunction with the microphone array 622 to track a moving voice while motion of the joystick controller is independently tracked (through the inertial sensor 632 and or light sources 634). In acoustic radar select a pre-calibrated listening zone is selected at runtime and sounds originating from sources outside the pre-calibrated listening zone are filtered out. The pre-calibrated listening zones may include a listening zone that corresponds to a volume of focus or field of view of the image capture unit 623. Examples of acoustic radar are described in detail in U.S. patent application Ser. No. 11/381,724, to Xiaodong Mao entitled "METHODS AND APPARATUS FOR TARGETED SOUND DETECTION AND CHARACTERIZATION", filed May 4, 2006, which is incorporated herein by reference. Any number of different combinations of different modes of providing control signals to the processor 601 may be used in conjunction with embodiments of the present invention. Such techniques may be implemented by the program 604 which may be stored in the memory 602 and executed by the processor 601 and may optionally include one or more instructions that direct the one or more processors to select a pre-calibrated listening zone at runtime and filter out sounds originating from sources outside the pre-calibrated listening zone. The pre-calibrated listening zones may include a listening zone that corresponds to a volume of focus or field of view of the image capture unit 623.

The program 604 may optionally include one or more instructions that direct the one or more processors to produce a discrete time domain input signal $x_m(t)$ from microphones $M_0 \ldots M_M$, of the microphone array 622, determine a listening sector, and use the listening sector in a semi-blind source separation to select the finite impulse response filter coefficients to separate out different sound sources from input signal $x_m(t)$. The program 604 may also include instructions to apply one or more fractional delays to selected input signals $x_m(t)$ other than an input signal $x_0(t)$ from a reference microphone $M_0$. Each fractional delay may be selected to optimize a signal to noise ratio of a discrete time domain output signal y(t) from the microphone array. The fractional delays may be selected to such that a signal from the reference microphone $M_0$ is first in time relative to signals from the other microphone(s) of the array. The program 604 may also include instructions to introduce a fractional time delay Δ into an output signal y(t) of the microphone array so that: $y(t+\alpha)=x(t+\alpha)*b_0+x(t-1+\Delta)*b_1+x(t-2+\Delta)*b_2+ \ldots +x(t-N+\Delta)b_N$, where Δ is between zero and ±1. Examples of such techniques are described in detail in U.S. patent application Ser. No. 11/381,729, to Xiadong Mao, entitled "ULTRA SMALL MICROPHONE ARRAY" filed May 4, 2006, the entire disclosures of which are incorporated by reference.

The program 604 may include one or more instructions which, when executed, cause the system 600 to select a pre-calibrated listening sector that contains a source of sound. Such instructions may cause the apparatus to determine whether a source of sound lies within an initial sector or on a particular side of the initial sector. If the source of sound does not lie within the default sector, the instructions may, when executed, select a different sector on the particular side of the default sector. The different sector may be characterized by an attenuation of the input signals that is closest to an optimum value. These instructions may, when executed, calculate an attenuation of input signals from the microphone array 622 and the attenuation to an optimum value. The instructions may, when executed, cause the apparatus 600 to determine a value of an attenuation of the input signals for one or more sectors and select a sector for which the attenuation is closest to an optimum value. Examples of such a technique are described, e.g., in U.S. patent application Ser. No. 11/381,725, to Xiadong Mao, entitled "METHODS AND APPARATUS FOR TARGETED SOUND DETECTION" filed May 4, 2006, the disclosures of which are incorporated herein by reference.

Signals from the inertial sensor 632 may provide part of a tracking information input and signals generated from the image capture unit 623 from tracking the one or more light sources 634 may provide another part of the tracking information input. By way of example, and without limitation, such "mixed mode" signals may be used in a football type video game in which a Quarterback pitches the ball to the right after a head fake head movement to the left. Specifically, a game player holding the controller 630 may turn his head to the left and make a sound while making a pitch movement swinging the controller out to the right like it was the football. The microphone array 622 in conjunction with "acoustic radar" program code can track the user's voice. The image capture unit 623 can track the motion of the user's head or track other commands that do not require sound or use of the controller. The sensor 632 may track the motion of the joystick controller (representing the football). The image capture unit 623 may also track the light sources 634 on the controller 630. The user may release of the "ball" upon reaching a certain amount and/or direction of acceleration of the joystick controller 630 or upon a key command triggered by pressing a button on the controller 630.

In certain embodiments of the present invention, an inertial signal, e.g., from an accelerometer or gyroscope may be used to determine a location of the controller 630. Specifically, an acceleration signal from an accelerometer may be integrated once with respect to time to determine a change in velocity and the velocity may be integrated with respect to time to determine a change in position. If values of the initial position and velocity at some time are known then the absolute position may be determined using these values and the changes in velocity and position. Although position determination using an inertial sensor may be made more quickly than using the image capture unit 623 and light sources 634 the inertial sensor 632 may be subject to a type of error known as "drift" in which errors that accumulate over time can lead to a discrepancy D between the position of the joystick 630 calculated from the inertial signal (shown in phantom) and the actual position of the joystick controller 630. Embodiments of the present invention allow a number of ways to deal with such errors.

For example, the drift may be cancelled out manually by re-setting the initial position of the controller 630 to be equal to the current calculated position. A user may use one or more of the buttons on the controller 630 to trigger a command to re-set the initial position. Alternatively, image-based drift may be implemented by re-setting the current position to a position determined from an image obtained from the image capture unit 623 as a reference. Such image-based drift compensation may be implemented manually, e.g., when the user triggers one or more of the buttons on the joystick controller 630. Alternatively, image-based drift compensation may be implemented automatically, e.g., at regular intervals of time or in response to game play. Such techniques may be implemented by program code instructions 604 which may be stored in the memory 602 and executed by the processor 601.

In certain embodiments it may be desirable to compensate for spurious data in the inertial sensor signal. For example the signal from the inertial sensor 632 may be oversampled and a sliding average may be computed from the oversampled signal to remove spurious data from the inertial sensor signal. In some situations it may be desirable to oversample the signal and reject a high and/or low value from some subset of data points and compute the sliding average from the remaining data points. Furthermore, other data sampling and manipulation techniques may be used to adjust the signal from the inertial sensor to remove or reduce the significance of spurious data. The choice of technique may depend on the nature of the signal, computations to be performed with the signal, the nature of game play or some combination of two or more of these. Such techniques may be implemented by instructions of the program 604 which may be stored in the memory 602 and executed by the processor 601.

The processor 601 may perform analysis of inertial signal data 606 as described above in response to the data 606 and program code instructions of a program 604 stored and retrieved by the memory 602 and executed by the processor module 601. Code portions of the program 604 may conform to any one of a number of different programming languages such as Assembly, C++, JAVA or a number of other languages. The processor module 601 forms a general-purpose computer that becomes a specific purpose computer when executing programs such as the program code 604. Although the program code 604 is described herein as being implemented in software and executed upon a general purpose computer, those skilled in the art will realize that the method of task management could alternatively be implemented using hardware such as an application specific integrated circuit (ASIC) or other hardware circuitry. As such, it should be understood that embodiments of the invention can be implemented, in whole or in part, in software, hardware or some combination of both.

Figure 5B:
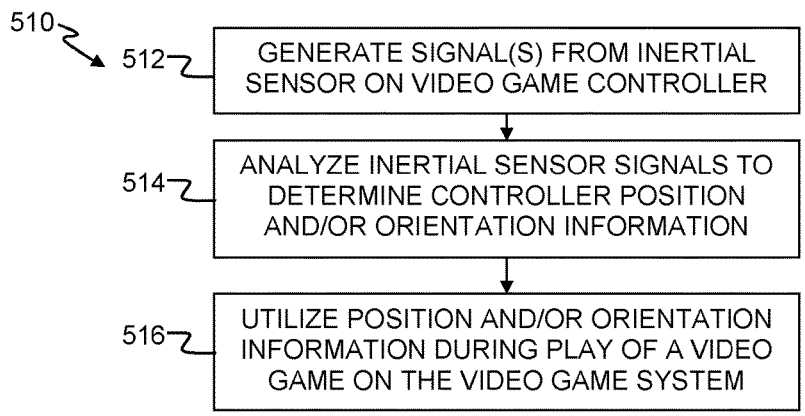
FIG. 5B is a flow diagram of a method for tracking a controller of a video game system according to an embodiment of the present invention.
Figure 5C:
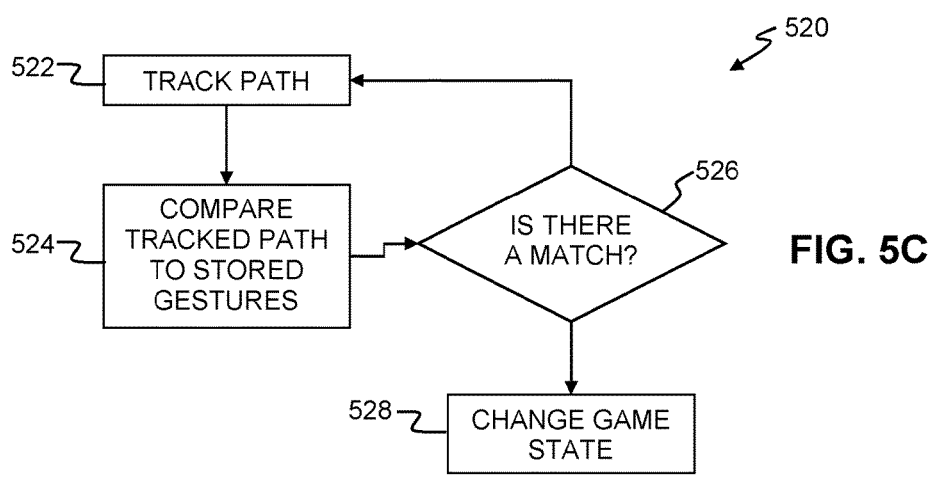
FIG. 5C is a flow diagram illustrating a method for utilizing position and/or orientation information during game play on a video game system according to an embodiment of the present invention.

In one embodiment, among others, the program code 604 may include a set of processor readable instructions that implement a method having features in common with the method 510 of FIG. 5B and the method 520 of FIG. 5C or some combination of two or more of these. The program code 604 may generally include one or more instructions that direct the one or more processors to analyze signals from the inertial sensor 632 to generate position and/or orientation information and utilize the information during play of a video game.

The program code 604 may optionally include processor executable instructions including one or more instructions which, when executed cause the image capture unit 623 to monitor a field of view in front of the image capture unit 623, identify one or more of the light sources 634 within the field of view, detect a change in light emitted from the light source(s) 634; and in response to detecting the change, triggering an input command to the processor 601. The use of LEDs in conjunction with an image capture device to trigger actions in a game controller is described e.g., in U.S. patent application Ser. No. 10/759,782 to Richard L. Marks, filed Jan. 16, 2004 and entitled: METHOD AND APPARATUS FOR LIGHT INPUT DEVICE, which is incorporated herein by reference in its entirety.

The program code 604 may optionally include processor executable instructions including one or more instructions which, when executed, use signals from the inertial sensor and signals generated from the image capture unit from tracking the one or more light sources as inputs to a game system, e.g., as described above. The program code 604 may optionally include processor executable instructions including one or more instructions which, when executed compensate for drift in the inertial sensor 632.

Although embodiments of the present invention are described in terms of examples related to a video game controller 630 games, embodiments of the invention, including the system 600 may be used on any user manipulated body, molded object, knob, structure, etc, with inertial sensing capability and inertial sensor signal transmission capability, wireless or otherwise.

Figure 7:
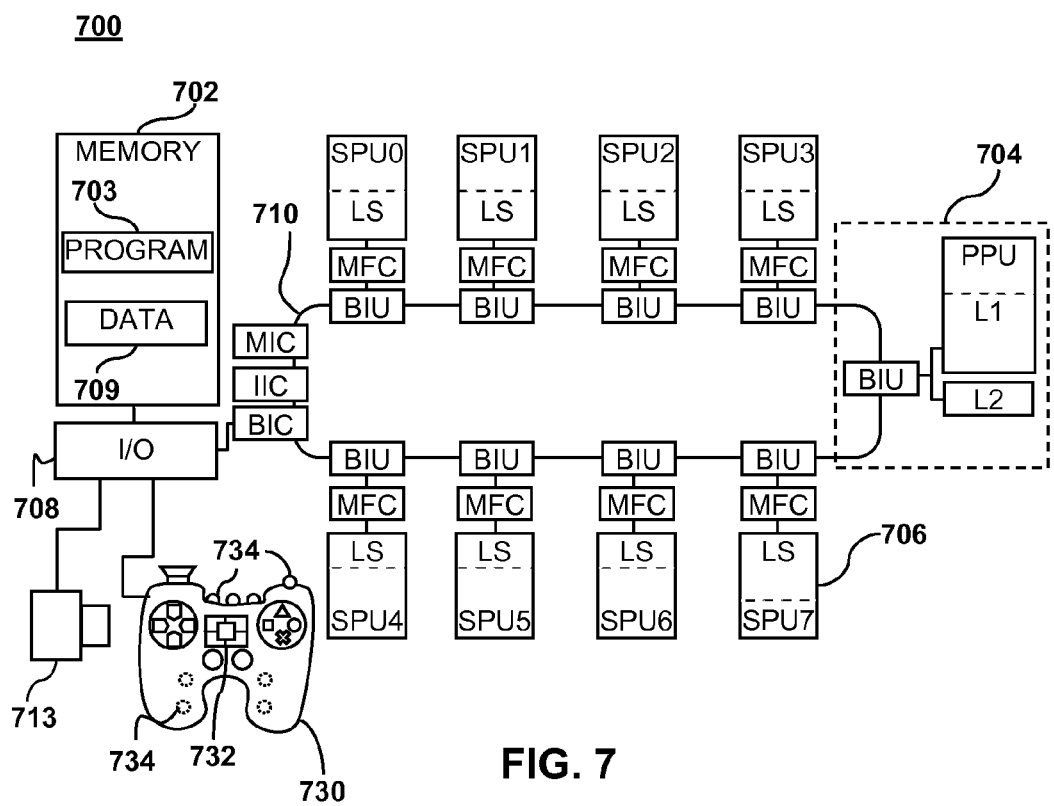
FIG. 7 is a block diagram of a cell processor implementation of the video game system according to an embodiment of the present invention.

By way of example, embodiments of the present invention may be implemented on parallel processing systems. Such parallel processing systems typically include two or more processor elements that are configured to execute parts of a program in parallel using separate processors. By way of example, and without limitation, FIG. 7 illustrates a type of cell processor 700 according to an embodiment of the present invention. The cell processor 700 may be used as the processor 601 of FIG. 6 or the processor 502 of FIG. 5A. In the example depicted in FIG. 7, the cell processor 700 includes a main memory 702, power processor element (PPE) 704, and a number of synergistic processor elements (SPEs) 706. In the example depicted in FIG. 7, the cell processor 700 includes a single PPE 704 and eight SPE 706. In such a configuration, seven of the SPE 706 may be used for parallel processing and one may be reserved as a back-up in case one of the other seven fails. A cell processor may alternatively include multiple groups of PPEs (PPE groups) and multiple groups of SPEs (SPE groups). In such a case, hardware resources can be shared between units within a group. However, the SPEs and PPEs must appear to software as independent elements. As such, embodiments of the present invention are not limited to use with the configuration shown in FIG. 7.

The main memory 702 typically includes both general-purpose and nonvolatile storage, as well as special-purpose hardware registers or arrays used for functions such as system configuration, data-transfer synchronization, memory-mapped I/O, and I/O subsystems. In embodiments of the present invention, a video game program 703 may be resident in main memory 702. The video program 703 may include an analyzer configured as described with respect to FIG. 5A, 5B or 5C above or some combination of these. The program 703 may run on the PPE. The program 703 may be divided up into multiple signal processing tasks that can be executed on the SPEs and/or PPE.

By way of example, the PPE 704 may be a 64-bit PowerPC Processor Unit (PPU) with associated caches L1 and L2. The PPE 704 is a general-purpose processing unit, which can access system management resources (such as the memory-protection tables, for example). Hardware resources may be mapped explicitly to a real address space as seen by the PPE. Therefore, the PPE can address any of these resources directly by using an appropriate effective address value. A primary function of the PPE 704 is the management and allocation of tasks for the SPEs 706 in the cell processor 700.

Although only a single PPE is shown in FIG. 7, some cell processor implementations, such as cell broadband engine architecture (CBEA), the cell processor 700 may have multiple PPEs organized into PPE groups, of which there may be more than one. These PPE groups may share access to the main memory 702. Furthermore the cell processor 700 may include two or more groups SPEs. The SPE groups may also share access to the main memory 702. Such configurations are within the scope of the present invention.

Each SPE 706 is includes a synergistic processor unit (SPU) and its own local storage area LS. The local storage LS may include one or more separate areas of memory storage, each one associated with a specific SPU. Each SPU may be configured to only execute instructions (including data load and data store operations) from within its own associated local storage domain. In such a configuration, data transfers between the local storage LS and elsewhere in the cell processor 700 may be performed by issuing direct memory access (DMA) commands from the memory flow controller (MFC) to transfer data to or from the local storage domain (of the individual SPE). The SPUs are less complex computational units than the PPE 704 in that they do not perform any system management functions. The SPU generally have a single instruction, multiple data (SIMD) capability and typically process data and initiate any required data transfers (subject to access properties set up by the PPE) in order to perform their allocated tasks. The purpose of the SPU is to enable applications that require a higher computational unit density and can effectively use the provided instruction set. A significant number of SPEs in a system managed by the PPE 704 allow for cost-effective processing over a wide range of applications.

Each SPE 706 may include a dedicated memory flow controller (MFC) that includes an associated memory management unit that can hold and process memory-protection and access-permission information. The MFC provides the primary method for data transfer, protection, and synchronization between main storage of the cell processor and the local storage of an SPE. An MFC command describes the transfer to be performed. Commands for transferring data are sometimes referred to as MFC direct memory access (DMA) commands (or MFC DMA commands).

Each MFC may support multiple DMA transfers at the same time and can maintain and process multiple MFC commands. Each MFC DMA data transfer command request may involve both a local storage address (LSA) and an effective address (EA). The local storage address may directly address only the local storage area of its associated SPE. The effective address may have a more general application, e.g., it may be able to reference main storage, including all the SPE local storage areas, if they are aliased into the real address space.

To facilitate communication between the SPEs 706 and/or between the SPEs 706 and the PPE 704, the SPEs 706 and PPE 704 may include signal notification registers that are tied to signaling events. The PPE 704 and SPEs 706 may be coupled by a star topology in which the PPE 704 acts as a router to transmit messages to the SPEs 706. Alternatively, each SPE 706 and the PPE 704 may have a one-way signal notification register referred to as a mailbox. The mailbox can be used by an SPE 706 to host operating system (OS) synchronization.

The cell processor 700 may include an input/output (I/O) function 708 through which the cell processor 700 may interface with peripheral devices, such as a microphone array 712 and optional image capture unit 713 and a game controller 730. The game controller unit may include an inertial sensor 732, and light sources 734. In addition an Element Interconnect Bus 710 may connect the various components listed above. Each SPE and the PPE can access the bus 710 through a bus interface units BIU. The cell processor 700 may also includes two controllers typically found in a processor: a Memory Interface Controller MIC that controls the flow of data between the bus 710 and the main memory 702, and a Bus Interface Controller BIC, which controls the flow of data between the I/O 708 and the bus 710. Although the requirements for the MIC, BIC, BIUs and bus 710 may vary widely for different implementations, those of skill in the art will be familiar their functions and circuits for implementing them.

The cell processor 700 may also include an internal interrupt controller IIC. The IIC component manages the priority of the interrupts presented to the PPE. The IIC allows interrupts from the other components the cell processor 700 to be handled without using a main system interrupt controller. The IIC may be regarded as a second level controller. The main system interrupt controller may handle interrupts originating external to the cell processor.

In embodiments of the present invention, certain computations, such as the fractional delays described above, may be performed in parallel using the PPE 704 and/or one or more of the SPE 706. Each fractional delay calculation may be run as one or more separate tasks that different SPE 706 may take as they become available.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A tracking device comprising:
   an inertial sensor unit mountable to a body of a game controller, wherein the inertial sensor unit is operable to produce information usable by a processor for quantifying a movement of the body through space, wherein the information is usable by the processor for controlling execution of a game program, wherein the inertial sensor unit includes (i) a single mass elastically coupled to a frame for translational and rotational movement relative to the frame with respect to each of two or more different axes; and (ii) two or more displacement sensors, wherein each of the two or more displacement sensors are operable to generate a displacement signal related to a displacement of the single mass relative to the frame, wherein the displacement sensors are positioned such that a first combination of displacement signals from the two or more displacement sensors can be analyzed by the processor or another processor to determine an angle of rotation of the frame with respect to one of the two or more different axes and a second combination of displacement signals from the two or more displacement sensors can be analyzed by the processor or another processor to determine a motion of the frame with respect to the same one or a different one of the two or more different axes; and
   a visible light source mountable to the body of the game controller and configured to be detected by an image capture unit coupled to the processor, wherein a position of the visible light source detected by the image capture unit is used by the processor or another processor to correct a drift in the information provided to the processor from the inertial sensor.

2. The tracking device as claimed in claim 1, wherein the game controller includes at least one input device assembled with the body of the game controller, wherein the input device is manipulable by a user to register an input from the user.

3. The tracking device as claimed in claim 1, wherein the body of the game controller is mountable to a user's body.

4. The tracking device as claimed in claim 1 or 3, wherein the information usable by a processor for quantifying a movement of the body through space includes information quantifying a first component of the movement of the body of the game controller along a first axis.

5. The tracking device as claimed in claim 4, wherein the information usable by a processor for quantifying a movement of the body through space includes information quantifying a second component of the movement along a second axis orthogonal to the first axis.

6. The tracking device as claimed in claim 5, wherein the information usable by a processor for quantifying a movement of the body through space includes information quantifying a third component of the movement along a third axis orthogonal to the first and second axes.

7. The tracking device as claimed in claim 4, 5, or 6, wherein the inertial sensor unit includes at least one accelerometer.

8. The tracking device as claimed in claim 4, 5, or 6, wherein the inertial sensor unit includes at least one mechanical gyroscope.

9. The tracking device as claimed in claim 8, wherein the inertial sensor unit includes at least one laser gyroscope.

10. The tracking device as claimed in claim 1, wherein the information usable by a processor for quantifying a movement of the body through space includes information quantifying the movement of the body of the game controller in at least three degrees of freedom.

11. The tracking device as claimed in claim 10, wherein the three degrees of freedom include pitch, yaw and roll.

12. The tracking device as claimed in claim 11, wherein the three degrees of freedom include an x-axis, a y-axis, and a z-axis, each of the x-axis, y-axis and the z-axis being orthogonal with respect to each other of the x-axis, y-axis, and z-axis.

13. The tracking device as claimed in claim 12, wherein the inertial sensor unit is operable to quantify the movement in six degrees of freedom, the six degrees of freedom including the three degrees of freedom and pitch, yaw and roll.

14. The tracking device as claimed in any of claims 4, 5, 6, 10, 11, 12, and 13, the tracking device being further operable to obtain a series of samples representative of acceleration of the body along at least one axis at different points in time from the information produced by the inertial sensor.

15. The tracking device as claimed in claim 14, further comprising the processor, wherein the processor is operable to determine a velocity of the body using the series of samples.

16. The tracking device as claimed in claim 15, wherein the processor is operable to determine the velocity by integrating acceleration values obtained from the series of samples over an interval of time.

17. The tracking device as claimed in claim 14, wherein the processor is operable to determine a displacement of the body in space by first integrating acceleration values obtained from the series of samples over an interval of time and then integrating a result of the first integrating over the interval of time.

18. The tracking device as claimed in claim 17, wherein the processor is operable to determine the displacement in relation to a prior-determined position to determine a present position of the body in space.

19. An apparatus including the tracking device as claimed in claim 1, the apparatus further comprising:
the processor, wherein the processor is configured to execute a program to provide an interactive game playable by the user in accordance with input obtained by processing the information produced by the inertial sensor unit.

20. The tracking device as claimed in claim 1 or 2, further comprising a communications interface operable to conduct digital communications with at least one of the processor, the game controller or both the processor and the game controller.

21. The tracking device as claimed in claim 20, wherein the communications interface includes a universal asynchronous receiver transmitter ("UART").

22. The tracking device as claimed in claim 21, wherein the UART is operable to perform at least one of receiving a control signal for controlling an operation of the tracking device, or for transmitting a signal from the tracking device for communication with another device.

23. The tracking device as claimed in claim 20 or 21, wherein the communications interface includes a universal serial bus ("USB") controller.

24. The tracking device as claimed in claim 23, wherein the USB controller is operable to perform at least one of receiving a control signal for controlling an operation of the tracking device, or for transmitting a signal from the tracking device for communication with another device.

25. The apparatus as claimed in claim 19, wherein the processor is operable to determine a velocity of the body using a series of samples.

26. The apparatus as claimed in claim 25, wherein the processor is operable to determine the velocity by integrating acceleration values obtained from the series of samples over an interval of time.

27. The apparatus as claimed in claim 19, wherein the processor is operable to determine a displacement of the body in space by first integrating acceleration values obtained from a series of samples over an interval of time and then integrating a result of the first integrating.

28. The apparatus as claimed in claim 19, the processor is operable to determine a position of the body in space by determining the displacement in relation to a previously determined position.

29. A game controller, comprising: a body; at least one input device assembled with the body, the input device manipulable by a user to register an input from the user; an inertial sensor unit mounted to the body, wherein the inertial sensor unit is operable to produce information for quantifying a movement of said body through space, wherein the inertial sensor unit includes (i) a single mass elastically coupled to a frame for translational and rotational movement relative to the frame with respect to each of two or more different axes; and (ii) two or more displacement sensors, wherein each of the two or more displacement sensors is operable to generate a displacement signal related to a displacement of the single mass relative to the frame, wherein the displacement sensors are positioned such that a first combination of displacement signals from the two or more displacement sensors can be analyzed by a processor to determine an angle of rotation of the frame with respect to one of the two or more different axes and a second combination of displacement signals from the two or more displacement sensors can be analyzed by the processor or another processor to determine a motion of the frame with respect to the same one or a different one of the two or more different axes; and a visible light source mounted to the body of the game controller and configured to be detected by an image capture unit, wherein a position of the visible light source detected by the image capture unit is used by the processor or another processor to correct for a drift in the determination of position and/or angle of rotation of the game controller.

30. A method for tracking a controller of a video game system, comprising: generating one or more signals from an inertial sensor unit mounted to the controller for the video game system, wherein the inertial sensor unit includes (i) a single mass elastically coupled to a frame for translational and rotational movement relative to the frame with respect to each of two or more different axes; and (ii) two or more displacement sensors, wherein each of the two or more displacement sensors is operable to generate corresponding displacement signals related to a displacement of the single mass relative to the frame, wherein the displacement sensors are positioned such that a first combination of displacement signals from the two or more displacement sensors can be analyzed by a processor to determine an angle of rotation of the frame with respect to one of the two or more different axes and a second combination of displacement signals from the two or more displacement sensors can be analyzed by the processor or another processor to determine a motion of the frame with respect to the same one or a different one of the two or more different axes;
analyzing with the processor or another processor the corresponding displacement signals to identify the first or second combination of displacement signals and determine position and/or angle of rotation information for the controller with respect to the two or more different axes;
correcting with the processor or another processor a drift in the determination of position and/or angle of rotation of the controller by detecting a position of a visible light source mounted to the controller with an image capture unit; and
utilizing the position and/or angle of rotation information during play of a video game on the video game system.

31. A method for use in providing input to a system, comprising the steps of: generating one or more signals from an inertial sensor unit mounted to a controller for the system, wherein the inertial sensor unit includes (i) a single mass elastically coupled to a frame for translational and rotational movement relative to the frame with respect to each of two or more different axes; and (ii) two or more displacement sensors, wherein each of the two or more displacement sensors is operable to generate a signal related to a displacement of the single mass relative to the frame, wherein the displacement sensors are positioned such that they produce particular combinations of signals that can be analyzed by a processor to determine an angle of rotation and a motion of the frame with respect to one of the two or more different axes;
analyzing displacement sensor signals from the two or more displacement sensors to determine position and angle of rotation information for the controller with respect to one of the two or more different axes;

correcting with the processor or another processor a drift in the determination of position and/or angle of rotation of the controller by detecting with an image capture unit a position of a visible light source mounted to the controller;

comparing the determined position and angle of rotation information with predetermined position information associated with one or more commands; and changing a state of the system if the determined position and/or angle of rotation information matches predetermined position information for a command of the one or more commands.

\* \* \* \* \*